United States Patent
Shen

(10) Patent No.: US 10,834,031 B2
(45) Date of Patent: Nov. 10, 2020

(54) INFORMATION EXCHANGE METHOD, CLIENT, AND APPARATUS

(71) Applicant: Huawei Technologies Co., Ltd., Shenzhen (CN)

(72) Inventor: Changshan Shen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 16/047,794

(22) Filed: Jul. 27, 2018

(65) Prior Publication Data

US 2018/0343214 A1 Nov. 29, 2018

Related U.S. Application Data

(63) Continuation of application No. PCT/CN2016/072507, filed on Jan. 28, 2016.

(51) Int. Cl.
*G06F 15/16* (2006.01)
*H04L 12/58* (2006.01)

(52) U.S. Cl.
CPC ............ *H04L 51/043* (2013.01); *H04L 51/08* (2013.01); *H04L 51/28* (2013.01); *H04L 51/36* (2013.01)

(58) Field of Classification Search
CPC ....... H04L 51/043; H04L 51/36; H04L 51/08; H04L 51/28
See application file for complete search history.

(56) References Cited

U.S. PATENT DOCUMENTS 9,641,479 B2 * 5/2017 Haruna ................... H04L 51/28
2004/0254998 A1 12/2004 Horvitz
2006/0101119 A1 5/2006 Qureshi et al.
(Continued)

FOREIGN PATENT DOCUMENTS

| CN | 1716921 A | 1/2006 |
| CN | 101557357 A | 10/2009 |
| CN | 103152249 A | 6/2013 |

OTHER PUBLICATIONS

Machine Translation and Abstract of Chinese Publication No. CN101557357, Oct. 14, 2009, 6 pages.
(Continued)

*Primary Examiner* — Ricahrd G Keehn
(74) *Attorney, Agent, or Firm* — Conley Rose, P.C.

(57) ABSTRACT

An information exchange method, a client, and an apparatus where the method includes obtaining, by an email client, a receiver email address and email description information of a current email; determining, by the email client, whether an instant messaging account bound to the receiver email address satisfies a pre-stored session initiation condition; and if the instant messaging account bound to the receiver email address satisfies the session initiation condition, sending, by the email client, the receiver email address and the email description information to an instant messaging client in to which a sender instant messaging account is logged, so that the instant messaging client requests an instant messaging server to create a session including the sender instant messaging account and a receiver instant messaging account, and the instant messaging client sends, in the session, an instant messaging message including the email description information.

18 Claims, 17 Drawing Sheets

(56) References Cited

U.S. PATENT DOCUMENTS

| | | | |
|---|---|---|---|
| 2006/0123347 A1* | 6/2006 | Hewitt | G06F 17/24 |
| | | | 715/748 |
| 2009/0137229 A1* | 5/2009 | Ye | G06Q 10/107 |
| | | | 455/412.1 |
| 2009/0319918 A1 | 12/2009 | Affronti et al. | |
| 2010/0250639 A1 | 9/2010 | Olson et al. | |
| 2010/0250693 A1 | 9/2010 | Zheng et al. | |
| 2013/0041964 A1* | 2/2013 | Lin | H04W 4/12 |
| | | | 709/206 |
| 2016/0119261 A1* | 4/2016 | Ghafourifar | H04L 51/36 |
| | | | 709/206 |
| 2016/0344679 A1* | 11/2016 | Lane | G06F 17/212 |
| 2016/0352677 A1* | 12/2016 | Gordon | H04L 51/36 |

OTHER PUBLICATIONS

Machine Translation and Abstract of Chinese Publication No. CN103152249, Jun. 12, 2013, 10 pages.

Foreign Communication From a Counterpart Application, PCT Application No. PCT/CN2016/072507, English Translation of International Search Report dated Oct. 18, 2016, 2 pages.

Foreign Communication From a Counterpart Application, PCT Application No. PCT/CN2016/072507, English Translation of Written Opinion dated Oct. 18, 2016, 9 pages.

Foreign Communication From a Counterpart Application, European Application No. 16887065.7, Extended European Search Report dated Dec. 19, 2018, 14 pages.

Foreign Communication From a Counterpart Application, Chinese Application No. 201680071131.6, Chinese Office Action dated Feb. 26, 2020, 9 pages.

* cited by examiner

INFORMATION EXCHANGE METHOD, CLIENT, AND APPARATUS

CROSS-REFERENCE TO RELATED APPLICATION

This application is a continuation of International Patent Application No. PCT/CN2016/072507 filed on Jan. 28, 2016. The disclosure of which is hereby incorporated by reference in its entirety.

TECHNICAL FIELD

The present disclosure relates to the communications field, and in particular, to an information exchange method, a client, and an apparatus.

BACKGROUND

Instant messaging and emails are used as common information exchange manners in people's lives. To better meet people's requirements, at present, a communications technology converging an instant messaging system and an email system exists in the industry. In the communications technology, an instant messaging client may display email information in the email system. Certainly, the email information herein is only a part of information, for example, a title or an abstract, of an email. For example, a user is registered with an instant messaging account A and an email account A. In this way, the user can view, on an instant messaging client in to which the instant messaging account A is logged, a title or an abstract of an email received by the email account A. However, in the communications technology, an email plug-in is integrated in the instant messaging client, and the instant messaging client logs in to an email server by using the email plug-in. The login herein means that an email account bound to an instant messaging account currently logged in to the instant messaging client is logged in to the email server. After the login, the instant messaging client obtains the email information from the email server by using the email plug-in. It can be learned that in the communications technology, the instant messaging client needs to complete two logins, one login is a login to an instant messaging server, and another login is a login to the email server. In addition, a verification step performed by using a verification number usually occurs in a current login process. Consequently, login efficiency is greatly reduced.

SUMMARY

Embodiments of the present disclosure provide an information exchange method, a client, and an apparatus, to improve exchange efficiency of email information.

According to a first aspect, an embodiment of the present disclosure provides an information exchange method, including obtaining, by an email client, a receiver email address and email description information of a current email; determining, by the email client, whether an instant messaging account bound to the receiver email address satisfies a pre-stored session initiation condition; and if the instant messaging account bound to the receiver email address satisfies the session initiation condition, sending, by the email client, the receiver email address and the email description information to an instant messaging client in to which a sender instant messaging account is logged, so that the instant messaging client requests an instant messaging server to create a session including the sender instant messaging account and a receiver instant messaging account, and the instant messaging client sends, in the session, an instant messaging message including the email description information, where the sender instant messaging account is an instant messaging account bound to the sender email address, and the receiver instant messaging account is the instant messaging account bound to the receiver email address.

In this implementation, the instant messaging client receives the receiver email address and the email description information that are sent by the email client, creates the session, and sends, in the session, the instant messaging message including the email description information. In this way, an instant messaging client in to which the receiver instant messaging account is logged can directly receive, in the session, the instant messaging message including the email description information. Compared with the other approaches in which a secondary login is required, exchange efficiency of email information can be improved in this implementation.

In a first possible implementation of the first aspect, the method may further include querying, by the email client, an online status of the instant messaging account bound to the receiver email address; and the determining, by the email client, whether an instant messaging account bound to the receiver email address satisfies a pre-stored session initiation condition includes determining, by the email client, whether the online status satisfies the pre-stored session initiation condition.

In this implementation, the receiver email address and the email description information can be flexibly sent to the instant messaging client according to the found online status of the instant messaging account bound to the receiver email address, so as to improve exchange flexibility of email information.

With reference to the first possible implementation of the first aspect or a second possible implementation of the first aspect, in a third possible implementation of the first aspect, the receiver email address includes at least one email address, and at least one of the email address included in the receiver email address is bound to an instant messaging account; and the session initiation condition may include an online instant messaging account exists in the instant messaging account bound to the email address included in the receiver email address; or a quantity of online instant messaging accounts in the instant messaging account bound to the email address included in the receiver email address exceeds a preset quantity threshold; or a proportion of online instant messaging accounts in the instant messaging account bound to the email address included in the receiver email address exceeds a preset proportion threshold; or an instant messaging account currently logged in to a mobile terminal exists in the instant messaging account bound to the email address included in the receiver email address; or a quantity of instant messaging accounts currently logged in to a mobile terminal device in the instant messaging account bound to the email address included in the receiver email address exceeds a preset quantity threshold.

In this implementation, by means of the listed session initiation condition, an online receiver instant messaging account may exist when the email description information is sent in the session. In this way, the email description information can be received by the receiver instant messaging account in time. In addition, a problem that the email description information cannot be received in time due to that no online receiver instant messaging account exists when the email description information is sent in the session can be avoided.

With reference to the first aspect or the first possible implementation of the first aspect or the second possible implementation of the first aspect, in a third possible implementation of the first aspect, the method may further include receiving, by the email client, instant messaging information sent by the instant messaging client, where the instant messaging information is included in an instant messaging message transmitted in the session; and generating, by the email client, an email including the instant messaging information, and sending the email including the instant messaging information to an email server.

In this implementation, the instant messaging information can be imported into an email system, so as to increase an exchange manner between the instant messaging information and the email system.

With reference to the first aspect or the first possible implementation of the first aspect or the second possible implementation of the first aspect or the third possible implementation of the first aspect, in a fourth possible implementation of the first aspect, the email description information includes at least one of the following: an email title, an email abstract, an email logo, and an email attachment.

In addition, in the first aspect, the method may further include when the email client determines that the online status satisfies the session initiation condition, displaying, by the email client, an initiation button for session initiation; and receiving, by the email client, a session initiation command that is entered by a user by using the initiation button, where the sending, by the email client, the receiver email address and the email description information to an instant messaging client in to which a sender instant messaging account is logged includes sending, by the email client in response to the session initiation command, the receiver email address and the email description information to the instant messaging client in to which the sender instant messaging account is logged.

In this implementation, the initiation button may be displayed, to inform the user that email information can be currently exchanged by using an instant messaging session, so as to improve user experience. In addition, the user can directly initiate session creation by using the initiation button. Therefore, exchange efficiency of the email information can be improved.

According to a second aspect, an embodiment of the present disclosure provides an information exchange method, including receiving an email message sent by an email server, where the email message carries an email address and email description information of a current email, and the email address includes a sender email address and a receiver email address of the current email; determining whether the current email satisfies a pre-stored session creation condition; and if the current email satisfies the session creation condition, sending the email address and an instant messaging message including the email description information to an instant messaging server, so that the instant messaging server sends the instant messaging message to a sender instant messaging account and a receiver instant messaging account by using the email address, where the sender instant messaging account is an instant messaging account bound to the sender email address, and the receiver instant messaging account is an instant messaging account bound to the receiver email address.

In this implementation, the email address and the instant messaging message including the email description information are sent to the instant messaging server. In this way, the instant messaging server can directly send the instant messaging message to the sender instant messaging account and the receiver instant messaging account. Therefore, an instant messaging client in to which the sender instant messaging account or the receiver instant messaging account is logged can directly receive the instant messaging message including the email description information. Compared with the other approaches in which a secondary login is required, exchange efficiency of email information can be improved in this implementation.

In a first possible implementation of the second aspect, the sending the email address and an instant messaging message including the email description information to an instant messaging server includes sending a session creation request carrying the email address to the instant messaging server, where the session creation request is used to request the instant messaging server to create a session including the sender instant messaging account and the receiver instant messaging account; and sending the instant messaging message including the email description information to the instant messaging server, where the instant messaging message is used to enable the instant messaging server to send the instant messaging message in the session.

In this implementation, the instant messaging server may be applied for the session. In this way, the instant messaging server can send the instant messaging message in the session, and therefore does not need to sequentially send the instant messaging message to the sender instant messaging account and the receiver instant messaging account, so as to improve exchange efficiency of email information. In addition, because the session is created, the sender instant messaging account and the receiver instant messaging account can exchange the instant messaging message in the session, thereby further improving exchange efficiency of the message.

With reference to the second aspect or the first possible implementation of the second aspect, in a second possible implementation of the second aspect, the receiver email address includes at least one email address, and at least one of the email address included in the receiver email address is bound to an instant messaging account; and the session creation condition may include an instant messaging account currently logged in to a mobile terminal exists in the instant messaging account bound to the email address included in the receiver email address; or a quantity of instant messaging accounts currently logged in to a mobile terminal device in the instant messaging account bound to the email address included in the receiver email address exceeds a preset quantity threshold; or a particular instant messaging account exists in the instant messaging account bound to the email address included in the receiver email address, where the particular instant messaging account is an instant messaging account having a particular relationship with the sender instant messaging account; or a quantity of particular instant messaging accounts in the instant messaging account bound to the email address included in the receiver email address exceeds a preset quantity threshold, where the particular instant messaging account is an instant messaging account having a particular relationship with the sender instant messaging account; or a quantity of times for which the current email is processed exceeds a preset quantity-of-times threshold, where the quantity of times for which the current email is processed includes a quantity of times for which the current email is forwarded, or the quantity of times for which the current email is processed includes a quantity of times for which the current email is replied, or the quantity of times for which the current email is processed includes a quantity of times for which the current email is forwarded and a quantity of times for which the current email is replied; or an online instant messaging account exists in the instant messaging account bound to the email address included in the receiver email address; or a quantity of online instant messaging accounts in the instant messaging account bound to the email address included in the receiver email address exceeds a preset quantity threshold; or a proportion of online instant messaging accounts in the instant messaging account bound to the email address included in the receiver email address exceeds a preset proportion threshold.

In this implementation, by means of the listed session initiation condition, an online receiver instant messaging account may exist when the email description information is sent in the session. In this way, the email description information can be received by the receiver instant messaging account in time. In addition, a problem that the email description information cannot be received in time due to that no online receiver instant messaging account exists when the email description information is sent in the session can be avoided. Moreover, the session may be created provided that a particular instant messaging account exists and the quantity of times for which the current email is processed exceeds the preset quantity-of-times threshold, so as to implement exchange intelligence of email information.

With reference to the second aspect or the first possible implementation of the second aspect or the second possible implementation of the second aspect, in a third possible implementation of the second aspect, the method may further include sending a query request carrying the receiver email address to the email server, where the query request is used to request the email server to query identification information of the receiver email address, and the email server stores the identification information of the receiver email address; and receiving the identification information that is of the receiver email address and that is returned by the email server in response to the query request, where the instant messaging message carries the identification information of the receiver email address, so that an instant messaging client in to which the receiver instant messaging account is logged extracts the identification information of the receiver email address from the instant messaging message, the instant messaging client sends, to a light app server, an email viewing request carrying the identification information of the receiver email address and the receiver email address, and the instant messaging client receives a web page that is converted from the current email and that is returned by the light app server in response to the email viewing request, where the web page is a web page obtained by the light app server by performing web page format conversion on the current email obtained from the email server, and the light app server obtains the current email from the email server by using the identification information of the receiver email address and the receiver email address.

In this implementation, the instant messaging client can obtain, by using the instant messaging message, the web page converted from the email. In this way, the instant messaging client can obtain all content of the email.

With reference to the second aspect or the first possible implementation of the second aspect or the second possible implementation of the second aspect or the third possible implementation of the second aspect, in a fourth possible implementation of the second aspect, the email description information may include at least one of the following: an email title, an email abstract, an email logo, and an email attachment.

According to a third aspect, an embodiment of the present disclosure provides an email client. Functions of implementing the method according to the first aspect are configured for the email client, and are implemented by hardware/software. The hardware/software includes units corresponding to the functions.

According to a fourth aspect, an embodiment of the present disclosure provides an information exchange apparatus. Functions of implementing the method according to the second aspect are configured for the information exchange apparatus, and are implemented by hardware/software. The hardware/software includes units corresponding to the functions.

According to a fifth aspect, an embodiment of the present disclosure provides an information exchange apparatus, including a processor, a network interface, a memory, and a communications bus, where the communications bus is configured to implement connection and communication between the processor, the network interface, and the memory, and the processor executes a program stored in the memory to implement the steps in the method according to the first aspect.

According to a sixth aspect, an embodiment of the present disclosure provides an information exchange apparatus, including a processor, a network interface, a memory, and a communications bus, where the communications bus is configured to implement connection and communication between the processor, the network interface, and the memory, and the processor executes a program stored in the memory to implement the steps in the method according to the second aspect.

According to a seventh aspect, an embodiment of the present disclosure provides an information exchange system, including an email client, an instant messaging client, and an instant messaging server, where the email client is configured to obtain a receiver email address and email description information of a current email, determine whether an instant messaging account bound to the receiver email address satisfies a pre-stored session initiation condition, and if yes, send the receiver email address and the email description information to the instant messaging client in to which a sender instant messaging account is logged, where the sender instant messaging account is an instant messaging account bound to the sender email address; the instant messaging client is configured to send a session creation request to the instant messaging server, where the session creation request is used to request for creating a session including the sender instant messaging account and a receiver instant messaging account, and the receiver instant messaging account is the instant messaging account bound to the receiver email address; the instant messaging server is configured to create the session in response to the session creation request; and the instant messaging client is further configured to send, in the session, an instant messaging message including the email description information.

According to an eighth aspect, an embodiment of the present disclosure provides an information exchange system, including a message conversion platform, an email server, and an instant messaging server, where the message conversion platform is configured to receive an email message sent by the email server, where the email message carries an email address and email description information of a current email, and the email address includes a sender email address and a receiver email address of the current email; the message conversion platform is further configured to determine whether the current email satisfies a pre-stored session creation condition, and if yes, send the email address and an instant messaging message including the email description information to the instant messaging server; and the instant messaging server is configured to send the instant messaging message to a sender instant messaging account and a receiver instant messaging account by using the email address, where the sender instant messaging account is an instant messaging account bound to the sender email address, and the receiver instant messaging account is an instant messaging account bound to the receiver email address.

BRIEF DESCRIPTION OF THE DRAWINGS

To describe the technical solutions in the embodiments of the present disclosure more clearly, the following briefly describes the accompanying drawings required for describing the embodiments or other approaches. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
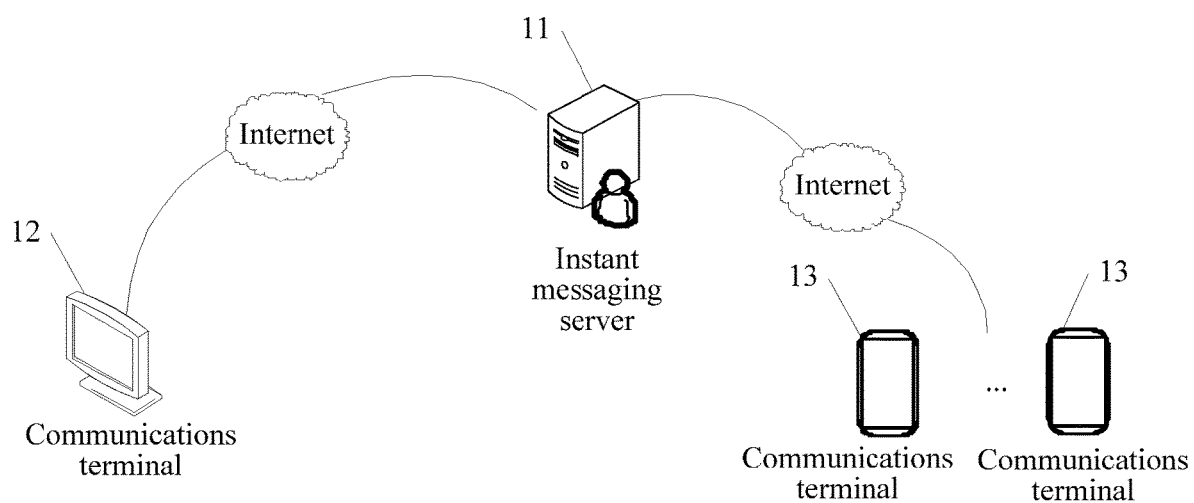
FIG. 1 is a diagram of a system architecture to which an information exchange method may be applied according to an embodiment of the present disclosure.

Referring to FIG. 1, FIG. 1 is a diagram of a system architecture to which an information exchange method may be applied according to an embodiment of the present disclosure. As shown in FIG. 1, the system architecture includes a plurality of communications terminals and an instant messaging server 11. An email client is installed in a communications terminal 12 in the plurality of communications terminals, and a sender instant messaging account is logged in to an instant messaging client installed in the communications terminal 12. The plurality of communications terminals further include at least one communications terminal 13. An instant messaging client is installed in the communications terminal 13, and a receiver instant messaging account is logged in to the instant messaging client.

In this embodiment of the present disclosure, the sender instant messaging account is an instant messaging account bound to a sender email address of an email, and the receiver instant messaging account is an instant messaging account bound to a receiver email address of an email. That an email address is bound to an instant messaging account may be understood as that the email address is used as an attribute of the instant messaging account. In this way, the instant messaging account can be determined by using the email address. Alternatively, that an email address is bound to an instant messaging account may be that a mapping relationship is established between the email address and the instant messaging account, and the instant messaging account bound to the email address can be determined by using the mapping relationship. In addition, in this embodiment of the present disclosure, the sender email address may be an email address for sending an email, and the receiver email address may be an email address for receiving an email. The receiver email address may include an email address of a recipient of the email, and may further include an email address to which the email is carbon-copied. In addition, in this embodiment of the present disclosure, both the email address of the recipient of the email and the email address to which the email is carbon-copied may be one or more email addresses.

In the system architecture shown in FIG. 1, the email client may communicate with an instant messaging client in to which a sender instant messaging account is logged.

In the system architecture shown in FIG. 1, the email client may send a receiver email address and email description information of an email to the instant messaging client in to which a sender instant messaging account is logged. In this way, the instant messaging client can request, by using the receiver email address, the instant messaging server to set up a session including the sender instant messaging account and a receiver instant messaging account. The instant messaging server may determine the receiver instant messaging account according to the receiver email address. Therefore, the session can be created. After the session is created, the instant messaging client in to which the sender instant messaging account is logged can send, in the session, an instant messaging message including the email description information.

In this embodiment of the present disclosure, the session may be understood as an exchange window for exchange of the instant messaging message. The exchange window includes at least two instant messaging accounts. If any instant messaging account in the exchange window sends any instant messaging message during the exchange, all the instant messaging accounts in the exchange window can receive the instant messaging message. In addition, in this embodiment of the present disclosure, the instant messaging message may be understood as a message transmitted between instant messaging accounts. In addition, in this embodiment, when there is only one receiver instant messaging account, the session may be a point-to-point session. When there are a plurality of receiver instant messaging accounts, the session may be a group session or a temporary group session.

In addition, in this embodiment of the present disclosure, the instant messaging message including the email description information may be understood as that the instant messaging message includes content in the email description information. For example, the email description information is assembled into an instant messaging message of an instant-messaging-message format, so that an instant messaging message including the email description information can be obtained. In addition, the email description information may be understood as description information used to describe an email. For example, the email description information may include at least one of the following: an email title, an email abstract, an email logo, and an email attachment.

For the email title and the email abstract, the email abstract may be a part of text content of an email or entire text content of an email.

Figure 2:
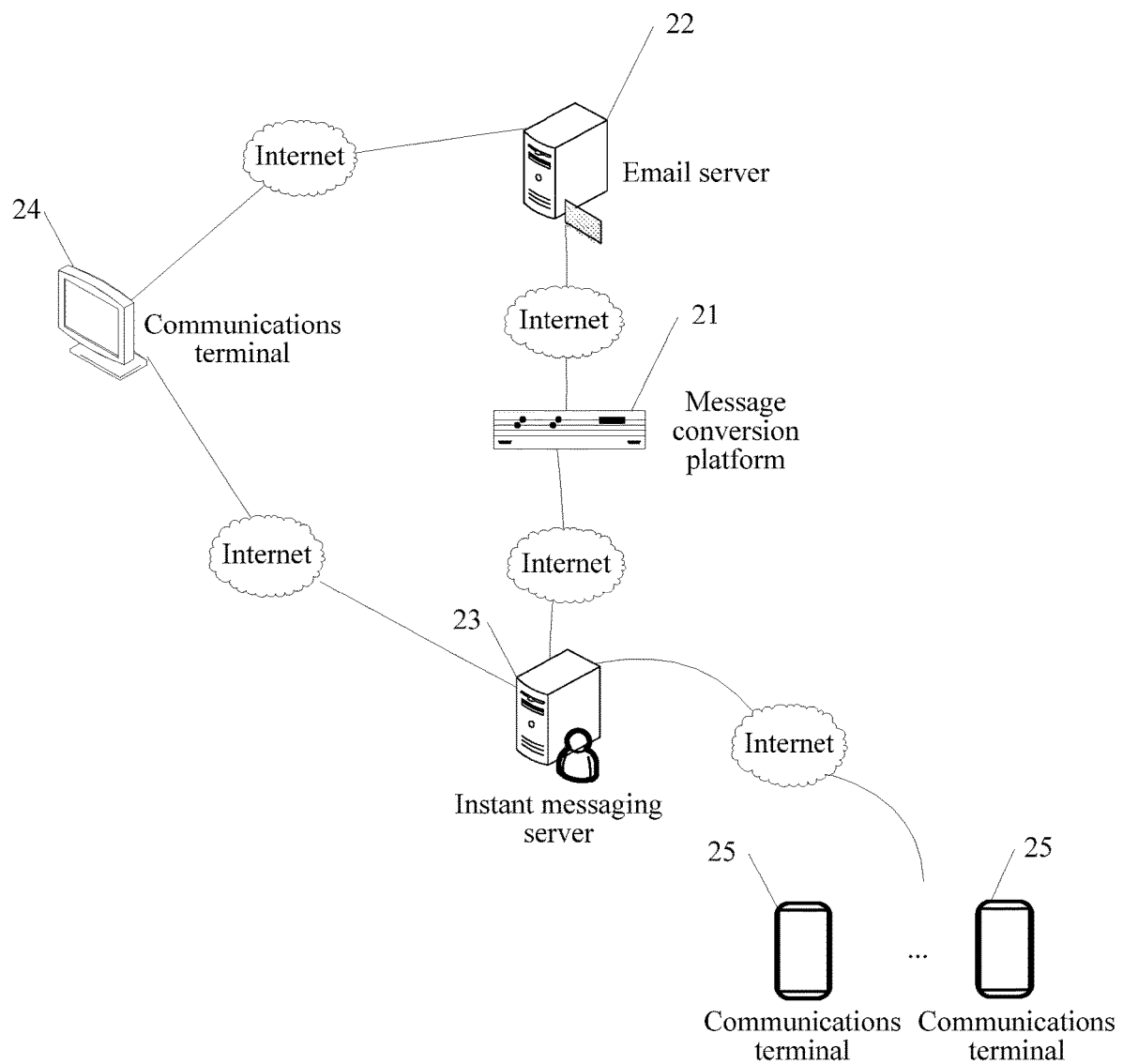
FIG. 2 is a diagram of another system architecture to which an information exchange method may be applied according to an embodiment of the present disclosure.

Referring to FIG. 2, FIG. 2 is a diagram of another system architecture to which an information exchange method may be applied according to an embodiment of the present disclosure. As shown in FIG. 2, the system architecture includes a message conversion platform 21, an email server 22, an instant messaging server 23, and a plurality of communications terminals. The plurality of communications terminals includes a communications terminal 24. An email client is installed in the communications terminal 24, and a sender instant messaging account may further be logged in to an instant messaging client installed in the communications terminal 24. The plurality of communications terminals further include at least one communications terminal 25, and a receiver instant messaging account is logged in to an instant messaging client installed in the communications terminal 25. In addition, the message conversion platform 21 may be an independent physical device, for example, a server or a computer. Alternatively, the message conversion platform 21 may be a functional module. The functional module may be deployed on a server that has a network connection with the email server 22 and that has a connection with the instant messaging server 23. Alternatively, the functional module may be deployed on the email server 22, the instant messaging server 23, or the like.

In the system architecture shown in FIG. 2, the message conversion platform 21 receives an email address and email description information that are sent by the email server 22. The message conversion platform 21 sends the email address and an instant messaging message including the email description information to the instant messaging server 23, and the instant messaging server 23 can determine the sender instant messaging account and the receiver instant messaging account by using the email address, so as to send the instant messaging message including the email description information to the sender instant messaging account and the receiver instant messaging account.

In addition, in this embodiment of the present disclosure, the communications terminal may include a handheld device, a vehicular device, a wearable device, or a computing device having a function of installing the email client and the instant messaging client, another processing device connected to a wireless modem, or various forms of user equipment (UE), mobile stations (MS), terminals, terminal equipment, or the like.

Figure 3:
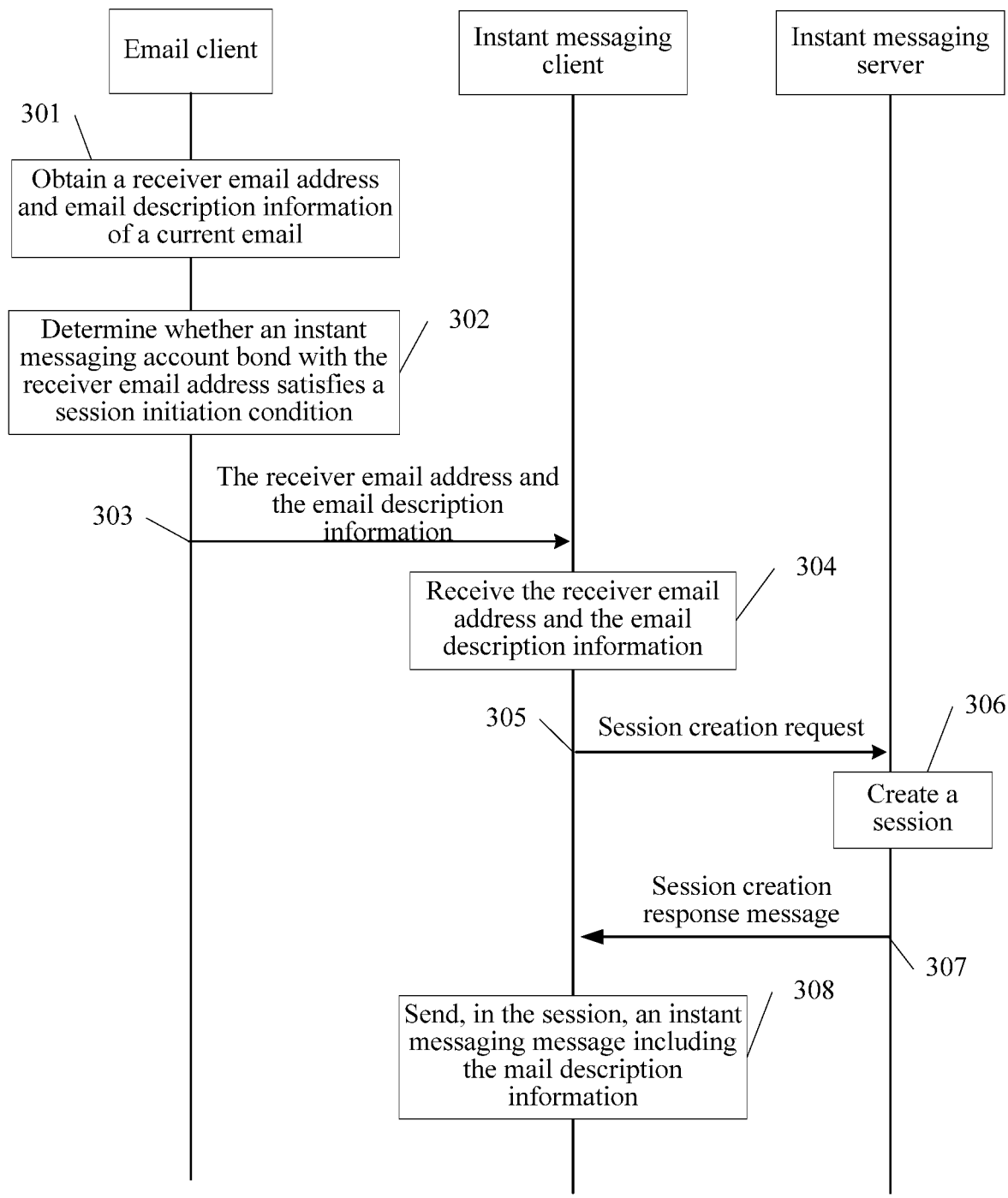
FIG. 3 is a schematic diagram of an information exchange method according to an embodiment of the present disclosure.

Referring to FIG. 3, FIG. 3 is a schematic diagram of an information exchange method according to an embodiment of the present disclosure. As shown in FIG. 3, the information exchange method includes the following steps.

301: An email client obtains a receiver email address and email description information of a current email.

In this embodiment, the current email may be an email of the email client that is currently to be sent, or may be an email of the email client that is currently sent. In addition, step 301 may further be extracting the receiver email address and the email description information from the current email. In addition, a sender email address of the current email may be logged in to the email client. Alternatively, an instant messaging account bound to the sender email address of the current email may be logged in to the email client. Alternatively, a user name or the like of the sender email address of the current email may be logged in to the email client.

302: The email client determines whether an instant messaging account bound to the receiver email address satisfies a pre-stored session initiation condition; and if yes, performs step 303, or if no, the procedure ends.

The instant messaging account bound to the receiver email address satisfying the session initiation condition may be that a quantity of instant messaging accounts bound to the receiver email address reaches a preset threshold. Whether each email address in the receiver email address is bound to an instant messaging account may be pre-stored. For example, the email client may store instant messaging accounts bound to some common email addresses. Alternatively, the email client may set by default that an email address whose suffix is a name of a particular company is bound to an instant messaging account, for example, set by default that an email address whose suffix is @xxxx.com is bound to an instant messaging account.

In addition, that the instant messaging account bound to the receiver email address satisfies the session initiation condition may be that an online status of the instant messaging account bound to the receiver email address satisfies the session initiation condition. For a specific implementation process, refer to an embodiment shown in FIG. 4.

303: The email client sends the receiver email address and the email description information to an instant messaging client in to which a sender instant messaging account is logged.

By means of step 303, the instant messaging client may request an instant messaging server to create a session including the sender instant messaging account and a receiver instant messaging account, and the instant messaging client sends, in the session, an instant messaging message including the email description information. The sender instant messaging account is an instant messaging account bound to the sender email address, and the receiver instant messaging account is the instant messaging account bound to the receiver email address.

When the email client and the instant messaging client are installed in a same communications terminal, in step 303, an internal information exchange module of the communications terminal may transmit the receiver email address and the email description information to the instant messaging client. When the email client and the instant messaging client are installed in different communications terminals, in step 303, a communications terminal to which the email client belongs may send the receiver email address and the email description information to a communications terminal to which the instant messaging client belongs.

304: The instant messaging client receives the receiver email address and the email description information that are sent by the email client.

305: The instant messaging client sends a session creation request to an instant messaging server, where the session creation request is used to request to create a session including the sender instant messaging account and a receiver instant messaging account.

The session creation request carries the receiver email address, or may further include the sender email address. Certainly, the sender email address is not necessary herein because the instant messaging server can recognize, when receiving the session creation request, that the session creation request is sent by the sender instant messaging account.

In addition, in this embodiment, the email client may further send the sender email address to the instant messaging client, and the instant messaging client further sends both the sender email address and the receiver email address to the instant messaging server. The instant messaging server creates the session according to the sender email address and the receiver email address.

306: The instant messaging server creates, in response to the session creation request, the session including the sender instant messaging account and the receiver instant messaging account.

After receiving the session creation request, the instant messaging server may determine the receiver instant messaging account according to the receiver email address, so as to create the session including the sender instant messaging account and the receiver instant messaging account.

307: The instant messaging server sends a session creation response message to the instant messaging client when completing creation of the session.

308: The instant messaging client receives the session creation response message returned by the instant messaging server in response to the session creation request, and sends, in the session, an instant messaging message including the email description information.

The session creation response message may indicate that the session has been successfully created. In addition, sending the instant messaging message in the session may be understood as sending the instant messaging message to the instant messaging server in the session. When receiving the instant messaging message, the instant messaging server may send the instant messaging message to the sender instant messaging account and the receiver instant messaging account.

In addition, when receiving the session creation response message, the instant messaging client may display the session, and sends, in the session, the instant messaging message including the email description information. In addition, the instant messaging message herein may be an instant messaging message obtained by the instant messaging client by assembling the email description information. For example, the instant messaging client may extract information content from the email description information, and assembles the extracted information content into an instant messaging message, so as to obtain the instant messaging message including the email description information. In addition, the instant messaging message herein may be a card instant messaging message. That is, the instant messaging message is presented in a virtual-card manner.

In this embodiment, by means of the foregoing steps, the instant messaging client can send, in the session, the instant messaging message including the email description information. In this way, an instant messaging client in to which the receiver instant messaging account is logged can directly receive, in the session, the instant messaging message including the email description information. Compared with other approaches in which a secondary login is required, exchange efficiency of email information can be improved in this embodiment.

In addition, in this embodiment, information transmission is only set up between the email client and the instant messaging client, and an email system and an instant messaging system cannot be destroyed by means of improvement. Therefore, in this embodiment, smooth message transition between the two systems can be implemented in the premise that integrity of the email system and the instant messaging system is maintained. The instant messaging system has mobility and instantaneity. In this way, in this embodiment, a user can view email information anytime and anywhere, and instantaneity and mobility of problem discussion by means of email information and richness of communication are improved.

Figure 4:
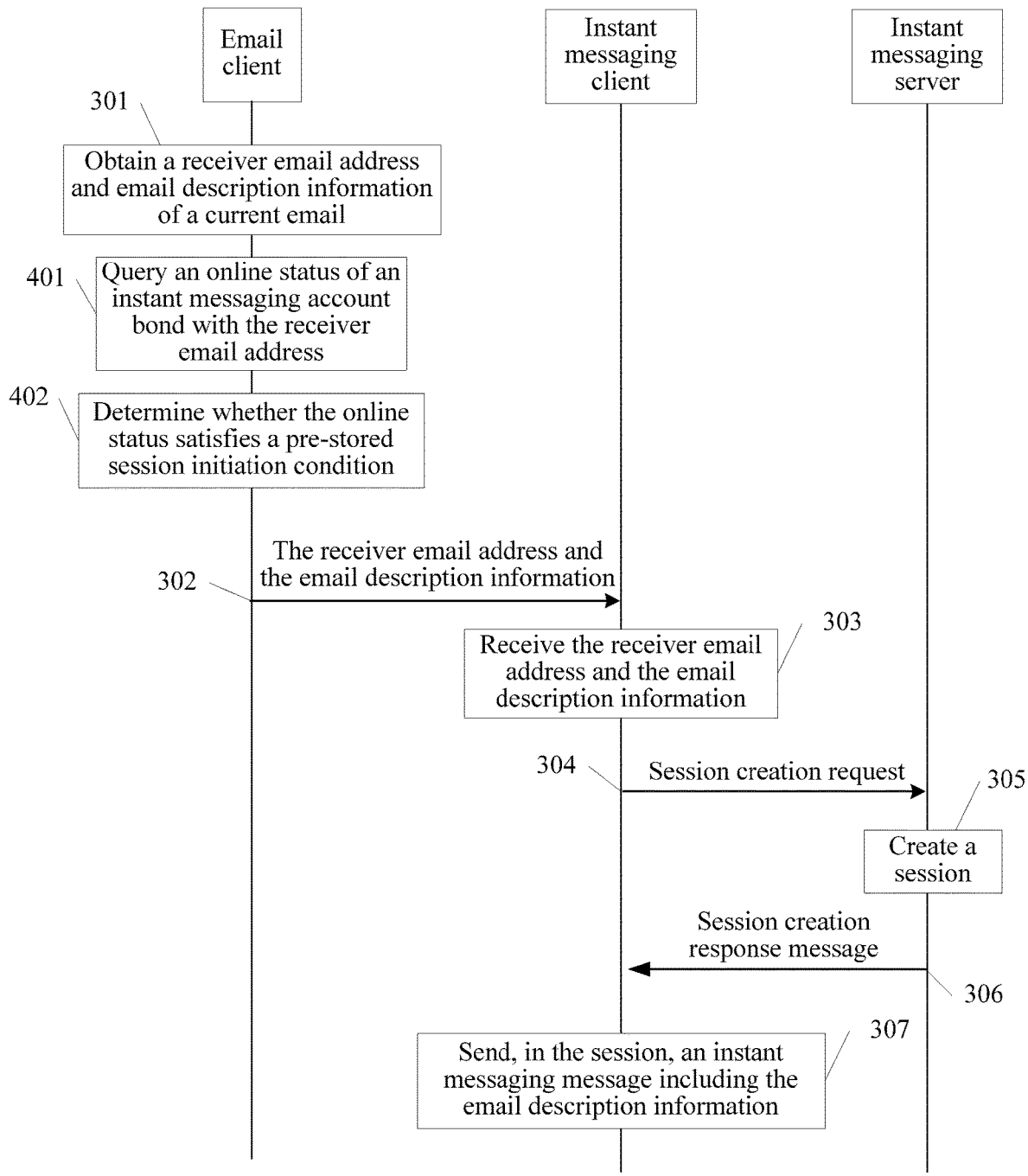
FIG. 4 is a schematic diagram of another information exchange method according to an embodiment of the present disclosure.

Referring to FIG. 4, FIG. 4 is a schematic diagram of another information exchange method according to an embodiment of the present disclosure. A solution set forth in FIG. 4 is obtained by partially modifying the solution set forth in FIG. 3. The following merely clarifies a part different from that in FIG. 3. For a same part, refer to the description in FIG. 3. As shown in FIG. 4, the information exchange method includes the following steps.

401: The email client queries an online status of the instant messaging account bound to the receiver email address.

In this embodiment, the email client may send a first query request carrying the receiver email address to the instant messaging client. The first query request is used to query the online status of the instant messaging account bound to the receiver email address. In this implementation, the method may further include the following steps: receiving, by the instant messaging client, the first query request sent by the email client; obtaining, by the instant messaging client, the receiver email address carried in the first query request, and sending a second query request carrying the receiver email address to the instant messaging server, where the second query request is used to query the online status of the instant messaging account bound to the receiver email address; and receiving, by the instant messaging client, status information that is of the online status of the instant messaging account bound to the receiver email address and that is returned by the instant messaging server in response to the second query request, and sending the status information to the email client.

By means of the foregoing steps, the email client may send the receiver email address and the email description information to the instant messaging client when determining, by using the status information, that the instant messaging account bound to the receiver email address satisfies the pre-stored session initiation condition.

Certainly, in this embodiment, the email client may further send a query request to an email server. The query request is used to request the email server to query the online status of the instant messaging account bound to the receiver email address. After receiving the query request, the email server may query the instant messaging server for the online status of the instant messaging account bound to the receiver email address, and return a found online status to the email client.

Figure 5:
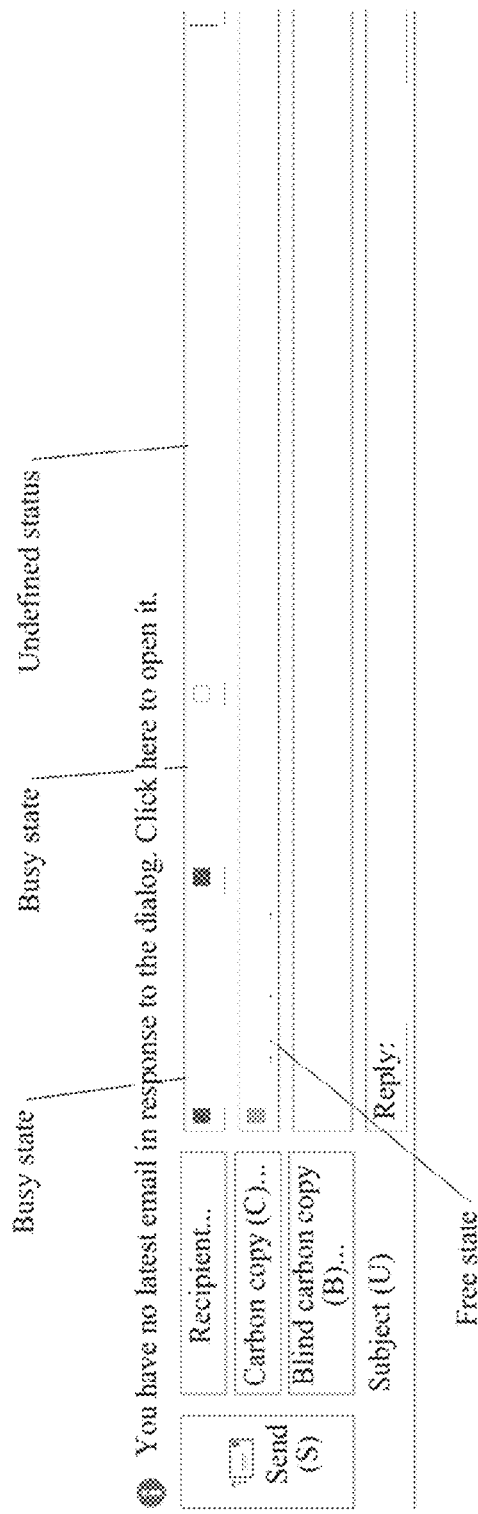
FIG. 5 is a schematic diagram of an email interface according to an embodiment of the present disclosure.

In addition, in this embodiment, after the online status is found, an online status of an instant messaging account bound to each email address may be further displayed in the email client. In this embodiment, that an instant messaging account is online may indicate a current login status of the instant messaging account. For example, the status may include a free state and a busy state. That an instant messaging account is not online may indicate that the instant messaging account is not currently logged in, for example, is in a leaving state. An email address not bound to an instant messaging account is also indicated to be not online, and this case may be indicated by using an undefined status. For example, the email client may display an online status shown in FIG. 5. In FIG. 5, the receiver email address of the current email includes three recipient email addresses and one carbon copy email address. Instant messaging accounts of two email addresses in the three recipient email addresses are in a buy state, and an instant messaging account of another email addresses is in an undefined status; an instant messaging account bound to the carbon copy email address is in a free state. It can be learned by means of the online status shown in FIG. 5 that instant messaging accounts bound to three email addresses in four receiver email addresses are online. Therefore, it may be determined by means of step 302 that the session initiation condition is satisfied, so that step 303 is performed.

In addition, in this embodiment, step 302 may include determining, by the email client, whether the online status satisfies the pre-stored session initiation condition; and if yes, performing step 303, or if no, the procedure may end.

In this embodiment, the method may further include the following steps: when the email client determines that the online status satisfies the session initiation condition, displaying, by the email client, an initiation button for session initiation; and receiving, by the email client, a session initiation command that is entered by a user by using the initiation button.

In this step implementation, step 303 may include sending, by the email client in response to the session initiation command, the receiver email address and the email description information to the instant messaging client in to which the sender instant messaging account is logged.

In this implementation, the initiation button may be displayed, to inform the user that email information can be currently exchanged by using an instant messaging session, so as to improve user experience. In addition, the user can directly initiate session creation by using the initiation button. Therefore, exchange efficiency of the email information can be improved.

Figure 6:
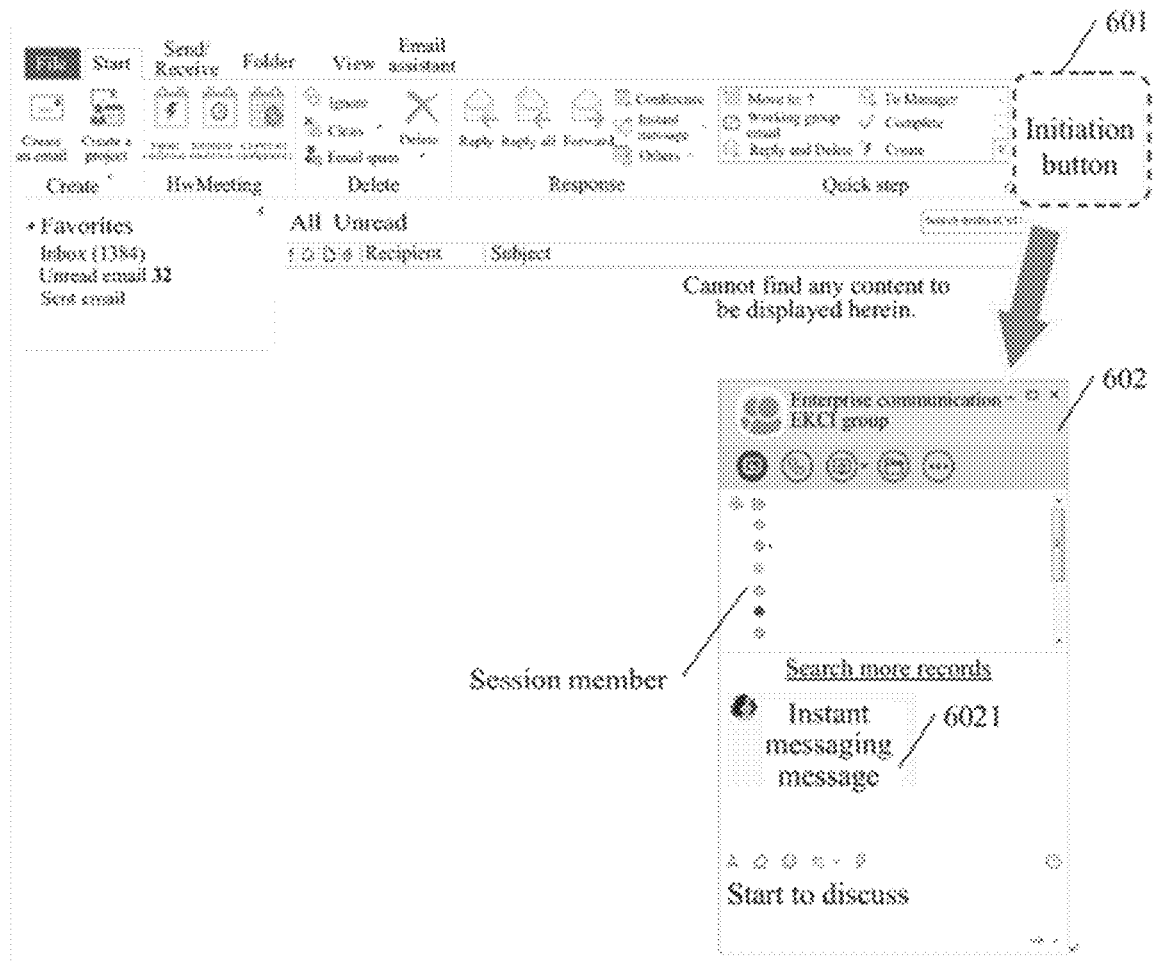
FIG. 6 is a schematic diagram of an email interface and an instant messaging interface according to an embodiment of the present disclosure.

In this implementation, alternatively, as shown in FIG. 6, when the email client determines that the online status satisfies the session initiation condition, an initiation button 601 for session initiation is displayed on the email client. When a user clicks the initiation button 601, step 303 is performed. Further, a session shown in 602 in FIG. 6 may be implemented by means of step 303 to step 308. An instant messaging message 6021 including email description information is sent in the session. Therefore, the email description information can be exchanged in an instant messaging session. In addition, an instant messaging account in the session may further exchange an instant messaging message in the session.

In addition, in this implementation, when it is determined that the online status does not satisfy the pre-stored session initiation condition, the initiation button may not be displayed, or the initiation button is displayed with a special effect, for example, is displayed in grayscale, so as to inform the user that an instant messaging session does not need to be created currently.

In this embodiment, the receiver email address includes at least one email address, and at least one of the email address included in the receiver email address is bound to an instant messaging account. That is, in this embodiment, an email address not bound to an instant messaging account may exist in the email addresses included in the receiver email address, and at least one email address is bound to an instant messaging account. Certainly, all email addresses may be bound to an instant messaging account.

In addition, the session initiation condition may include an online instant messaging account exists in the instant messaging account bound to the email address included in the receiver email address; or a quantity of online instant messaging accounts in the instant messaging account bound to the email address included in the receiver email address exceeds a preset quantity threshold; or a proportion of online instant messaging accounts in the instant messaging account bound to the email address included in the receiver email address exceeds a preset proportion threshold; or an instant messaging account currently logged in to a mobile terminal exists in the instant messaging account bound to the email address included in the receiver email address; or a quantity of instant messaging accounts currently logged in to a mobile terminal device in the instant messaging account bound to the email address included in the receiver email address exceeds a preset quantity threshold.

The instant messaging account bound to the email address included in the receiver email address may be understood as all instant messaging accounts bound to the email address included in the receiver email address. For example, the receiver email address includes a recipient email address 1, a recipient email address 2, a carbon copy email address 1, and a carbon copy email address 2. The recipient email address 1, the recipient email address 2, and the carbon copy email address 1 are respectively bound to an instant messaging account 1, an instant messaging account 2, and an instant messaging account 3, and the carbon copy email address 2 is not bound to an instant messaging account, then the instant messaging account bound to the email address included in the receiver email address includes the instant messaging account 1, the instant messaging account 2, and the instant messaging account 3.

In this implementation, by means of the listed session initiation condition, an online receiver instant messaging account may exist when the email description information is sent in the session. In this way, the email description information can be received by the receiver instant messaging account in time. In addition, a problem that the email description information cannot be received in time due to that no online receiver instant messaging account exists when the email description information is sent in the session can be avoided.

In addition, in this embodiment of the present disclosure, the method may further include the following steps: receiving, by the email client, instant messaging information sent by the instant messaging client, where the instant messaging information is included in the instant messaging message transmitted in the session; and generating, by the email client, an email including the instant messaging information, and sending the email including the instant messaging information to an email server.

The instant messaging message transmitted in the session may include the instant messaging message sent by the sender instant messaging account in the session, and may further include an instant messaging message sent by the receiver instant messaging account in the session. In addition, a receiver email address of the email sent to the email server may be the same as or different from the receiver email address of the current email. Alternatively, a receiver email address of the email sent to the email server may be some email addresses in the email addresses of the current email. For example, an email address not bound to an instant messaging account exists in the receiver email addresses of the current email. In this way, the instant messaging message in the session may be sent to the email address not bound to an instant messaging account.

It should be noted that this implementation may alternatively be implemented in the embodiment shown in FIG. 3.

In this implementation, based on the solution shown in FIG. 3, additionally, the receiver email address and the email description information can be flexibly sent to the instant messaging client according to the found online status of the instant messaging account bound to the receiver email address, so as to improve exchange flexibility of email information.

Figure 7:
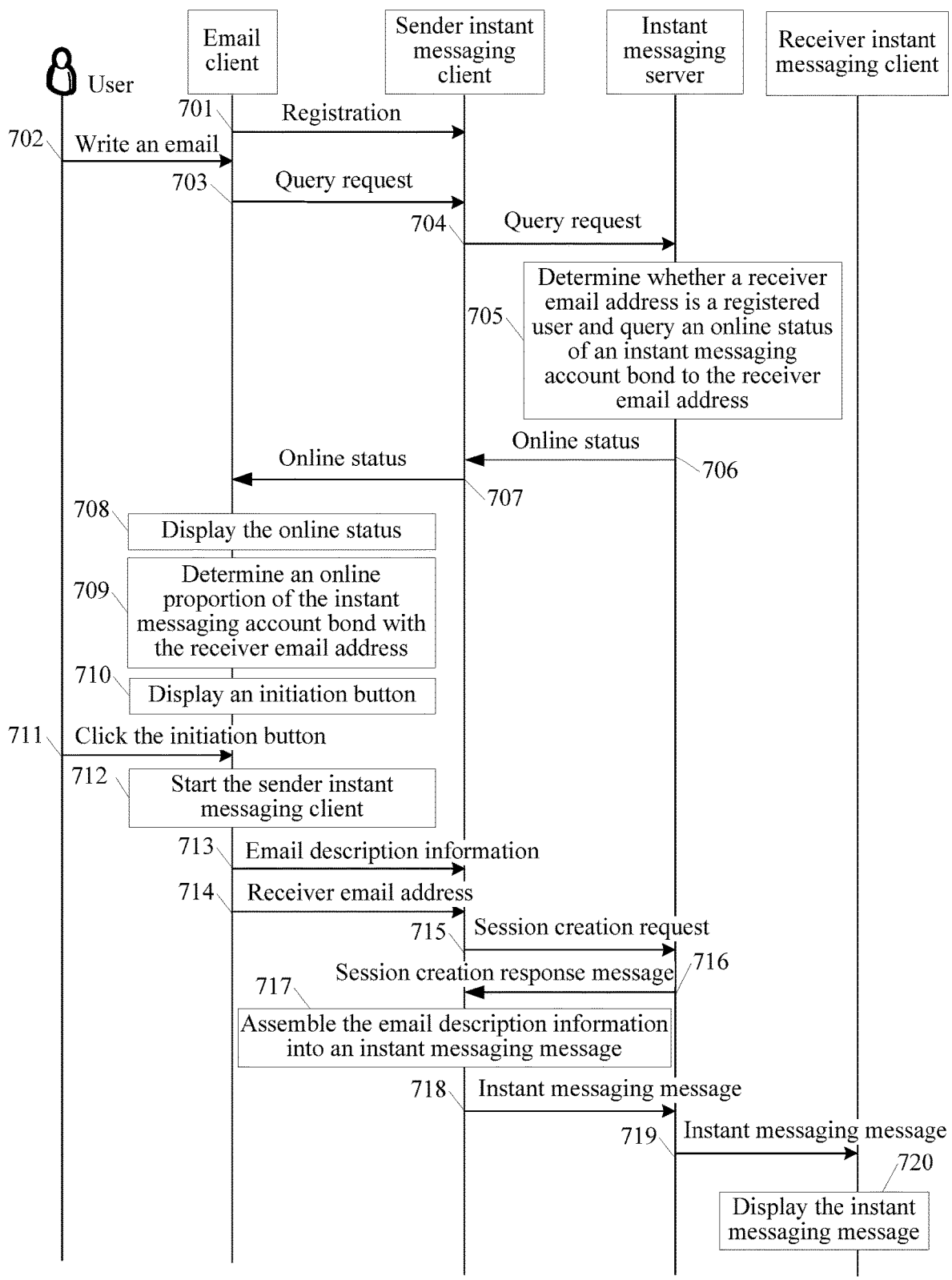
FIG. 7 is a schematic diagram of another information exchange method according to an embodiment of the present disclosure.

Referring to FIG. 7, FIG. 7 is a schematic diagram of another information exchange method according to an embodiment of the present disclosure. As shown in FIG. 7, the information exchange method includes the following steps.

701: An email client registers with a sender instant messaging client.

The registration herein may be understood as applying the sender instant messaging client for a permission to send email information. An API function may be used to register with the sender instant messaging client. In addition, the registration herein may alternatively be COM registration.

It should be noted that the registration in step 701 is only an optional step. A relationship of a sender email address and a sender instant messaging account exists between the email client and the sender instant messaging client. In this case, the email client may send another message such as email information to the sender instant messaging client by using the relationship. Therefore, the method can be implemented without registration.

702: A user writes an email in the email client.

703: The email client sends a query request to the sender instant messaging client, where the query request may include a receiver email address of the email.

704: The sender instant messaging client sends the query request to an instant messaging server, where the query request is used to request for whether the receiver email address is a registered user, the registered user means that an email address is bound to an instant messaging account; in addition, the query request is further used to query an online status of an instant messaging account bound to the receiver email address.

705: The instant messaging server determines whether the receiver email address is a registered user and queries the online status of the instant messaging account bound to the receiver email address.

706: The instant messaging server returns an online status to the sender instant messaging client, where the online status indicates the online status of the instant messaging account bound to the receiver email address, and the online status herein includes a free state, a busy state, a leaving state, and an undefined status that are shown in FIG. 5.

707: The sender instant messaging client returns the online status to the email client.

708: The email client displays the online status.

709: The email client determines an online proportion of the instant messaging account bound to the receiver email address, and when the online proportion is higher than 50%, performs step 710, where the online proportion herein indicates a proportion of a quantity of online instant messaging accounts in a quantity of email addresses included in the receiver email address.

710: The email client displays an initiation button, where the initiation button is used to initiate a session.

711: The user clicks the initiation button.

712: The email client starts the sender instant messaging client.

The step may be understood as waking up the sender instant messaging client. Certainly, the step is merely optional. For example, step 712 may not be selected and step 713 is directly performed because the sender instant messaging client has been waken up when performing step 704.

713: The email client transmits email description information to the sender instant messaging client.

714: The email client transmits the receiver email address to the sender instant messaging client.

715. The sender instant messaging client sends a session creation request to the instant messaging server, where the session creation request carries the receiver email address.

Certainly, in step 713 or step 714, the email client may further transmit a sender email address to the sender instant messaging client. In step 715, the sender instant messaging client may also transmit the sender email address to the instant messaging server. Certainly, this is merely optional because the instant messaging server can also create a session including a sender instant messaging account and a receiver instant messaging account without transmission of the sender email address.

716: The instant messaging server sends a session creation response message to the sender instant messaging client, where the response message indicates that a session including a sender instant messaging account and a receiver instant messaging account has been created.

717: The sender instant messaging client assembles the email description information into an instant messaging message, that is, the instant messaging message includes the email description information.

718: The sender instant messaging client sends the instant messaging message to the instant messaging server in the created session.

719: The instant messaging server sends the instant messaging message to a receiver instant messaging client, where a receiver instant messaging account is logged in to the receiver instant messaging client.

720: The receiver instant messaging client displays the instant messaging message, where in this way, the user can find out the email description information included in the instant messaging message.

Figure 8:
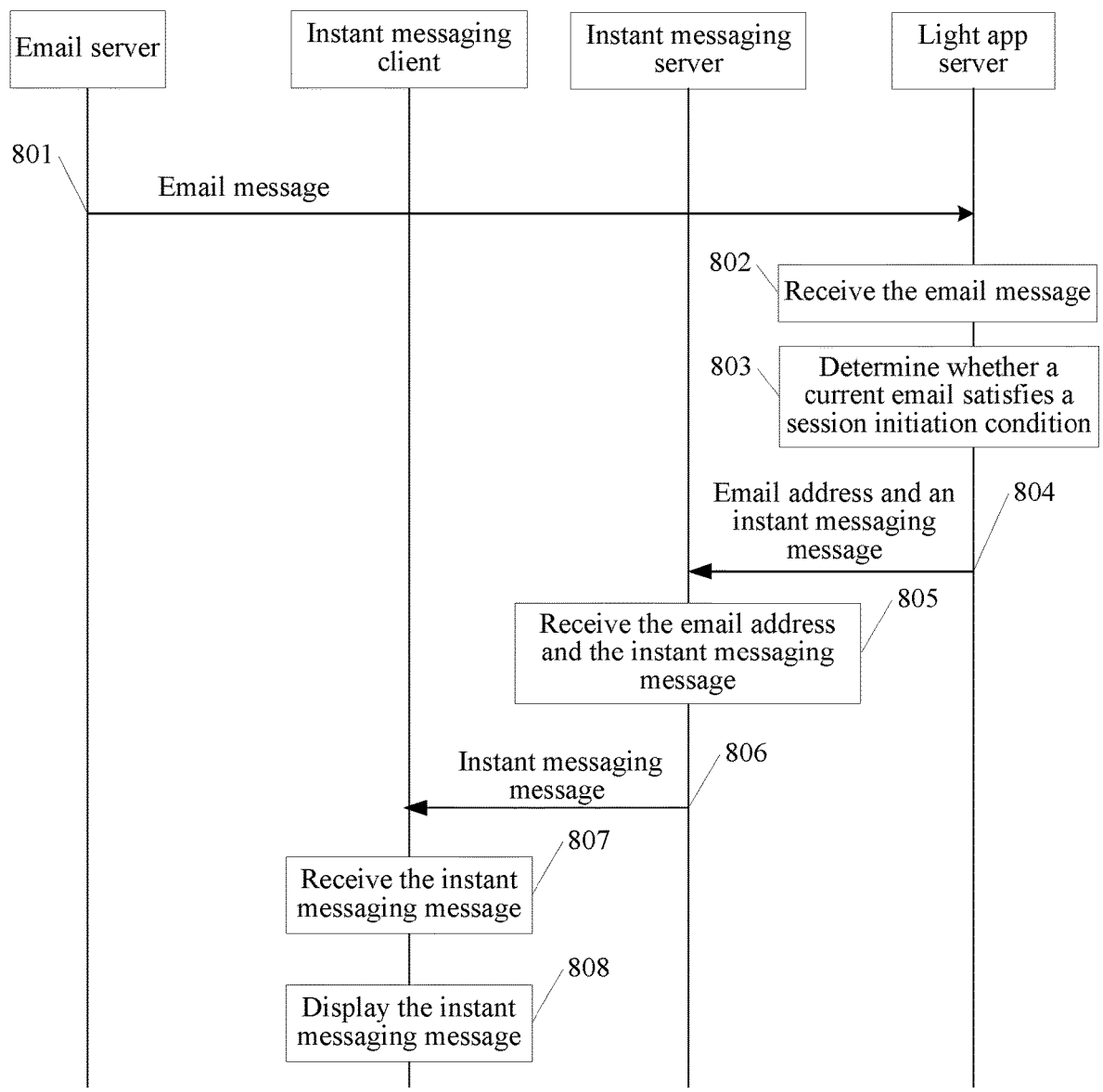
FIG. 8 is a schematic diagram of another information exchange method according to an embodiment of the present disclosure.

Referring to FIG. 8, FIG. 8 is a schematic diagram of another information exchange method according to an embodiment of the present disclosure. As shown in FIG. 8, the information exchange method includes the following steps.

801: An email server sends an email message to a message conversion platform, where the email message includes an email address and email description information of a current email, and the email address includes a sender email address and a receiver email address of the current email.

In this embodiment, the current email may be an email currently sent by an email client to the email server. For example, when receiving the email sent by the email client, the email server may send the email message to the message conversion platform, for example, send the received email to the message conversion platform, or extract the email address and the email description information of the email and send the email address and the email description information to the message conversion platform.

802: The message conversion platform receives the email message sent by the email server.

803: The message conversion platform determines whether the current email satisfies a pre-stored session initiation condition; and if yes, performs step 804, or if no, the procedure may end.

In this embodiment, the current email satisfying the session creation condition may be that a theme of the current email is a preset theme, for example, a conference theme; or may be that the receiver email address of the current email satisfies the session creation condition. For example, the current email satisfying the session creation condition may be that a quantity of email addresses included in the receiver email address exceeds a preset threshold.

In addition, in this embodiment, the receiver email address may include at least one email address, and at least one of the email address included in the receiver email address is bound to an instant messaging account.

The session creation condition may include an instant messaging account currently logged in to a mobile terminal exists in the instant messaging account bound to the email address included in the receiver email address; or a quantity of instant messaging accounts currently logged in to a mobile terminal in the instant messaging account bound to the email address included in the receiver email address exceeds a preset quantity threshold; or a particular instant messaging account exists in the instant messaging account bound to the email address included in the receiver email address, where the particular instant messaging account is an instant messaging account having a particular relationship with a sender instant messaging account; or a quantity of particular instant messaging accounts in the instant messaging account bound to the email address included in the receiver email address exceeds a preset quantity threshold, where the particular instant messaging account is an instant messaging account having a particular relationship with a sender instant messaging account; or a quantity of times for which the current email is processed exceeds a preset quantity-of-times threshold, where the quantity of times for which the current email is processed includes a quantity of times for which the current email is forwarded, or the quantity of times for which the current email is processed includes a quantity of times for which the current email is replied, or the quantity of times for which the current email is processed includes a quantity of times for which the current email is forwarded and a quantity of times for which the current email is replied; or an online instant messaging account exists in the instant messaging account bound to the email address included in the receiver email address; or a quantity of online instant messaging accounts in the instant messaging account bound to the email address included in the receiver email address exceeds a preset quantity threshold; or a proportion of online instant messaging accounts in the instant messaging account bound to the email address included in the receiver email address exceeds a preset proportion threshold.

In this implementation, by means of the listed session initiation condition, an online receiver instant messaging account may exist when the email description information is sent in the session. In this way, the email description information can be received by the receiver instant messaging account in time. In addition, a problem that the email description information cannot be received in time due to that no online receiver instant messaging account exists when the email description information is sent in the session can be avoided. Moreover, a session may be created provided that the particular instant messaging account exists and the quantity of times for which the current email is processed exceeds the preset quantity-of-times threshold, so as to implement exchange intelligence of the email information.

In addition, the session creation condition may alternatively be understood as policy rules. In this implementation, a session can be performed and the instant messaging message can be transmitted as long as the policy rules are satisfied.

In addition, in the foregoing implementation, the quantity of times for which the current email is processed can be further optimized, for example, to avoid frequent conversion when the quantity of times for which the current email is processed reaches the preset quantity-of-times threshold and to create a session. The message conversion platform may record and trace a quantity of times for which each email is processed. If the quantity of times exceeds the preset quantity-of-times threshold, the quantity of times for which the email is processed is reset to 0. Subsequently, when the reset quantity-of-times threshold is reached again, the email description information is re-converted into an instant messaging message and the instant messaging message is sent in the session, the quantity of times for which the email is processed is reset to 0, and the created session does not need to be recreated, and so on.

It should be noted that in this embodiment of the present disclosure, the preset quantity threshold and the preset quantity-of-times threshold may both be preset, or may be set by default. In addition, different thresholds may be set for different scenarios or content.

804: The message conversion platform sends the email address and an instant messaging message including the email description information to an instant messaging server.

By means of step 804, the instant messaging server may send the instant messaging message to the sender instant messaging account and a receiver instant messaging account by using the email address, where the sender instant messaging account is an instant messaging account bound to the sender email address, and the receiver instant messaging account is an instant messaging account bound to the receiver email address.

It should be noted that the instant messaging message may be generated by the message conversion platform by using the email description information. For example, the email description information is assembled into the instant messaging message or the email description information is converted into the instant messaging message. In addition, no limitation is set to a time sequence in which the message conversion platform generates the instant messaging message and step 803 is performed. For example, the email address may be first sent, and then the instant messaging message is generated and sent. Alternatively, the instant messaging message may be first generated, and then the email address and the instant messaging message are sent.

805: The instant messaging server receives the email address and the instant messaging message including the email description information that are sent by the message conversion platform.

806: The instant messaging server sends the instant messaging message to a sender instant messaging account and a receiver instant messaging account.

In the step, after receiving the email address, the instant messaging server may determine the sender instant messaging account and the receiver instant messaging account that are bound to the email address, so as to send the instant messaging message to the sender instant messaging account and the receiver instant messaging account.

807: The instant messaging client receives the instant messaging message that includes the email description information and that is sent by the instant messaging server.

It can be learned by means of the foregoing steps that the email description information included in the instant messaging message received in step 806 is received by the instant messaging server and is sent by the message conversion platform, and is sent to the instant messaging client by using the email address sent by the message conversion platform. The email description information and the email address are received by the message conversion platform and are sent by the email server, and are the email description information and the email address of the current email of the email server.

In addition, the sender instant messaging account or the receiver instant messaging account is logged in to the instant messaging client, and the sender instant messaging account is an instant messaging account bound to the sender email address included in the email address, and the receiver instant messaging account is an instant messaging account bound to the receiver email address included in the email address.

In this way, by means of the foregoing steps, the instant messaging client in to which the sender instant messaging account is logged and the instant messaging client in to which the receiver instant messaging account is logged can both receive the instant messaging message.

808: The instant messaging client displays the instant messaging message.

In this embodiment, the message forwarding platform sends the email address and the instant messaging message including the email description information to the instant messaging server. In this way, the instant messaging server can directly send the instant messaging message to the sender instant messaging account and the receiver instant messaging account. In this way, an instant messaging client in to which the sender instant messaging account or the receiver instant messaging account is logged can directly receive the instant messaging message including the email description information. Compared with other approaches in which a secondary login is required, exchange efficiency of email information can be improved in this implementation.

Figure 9:
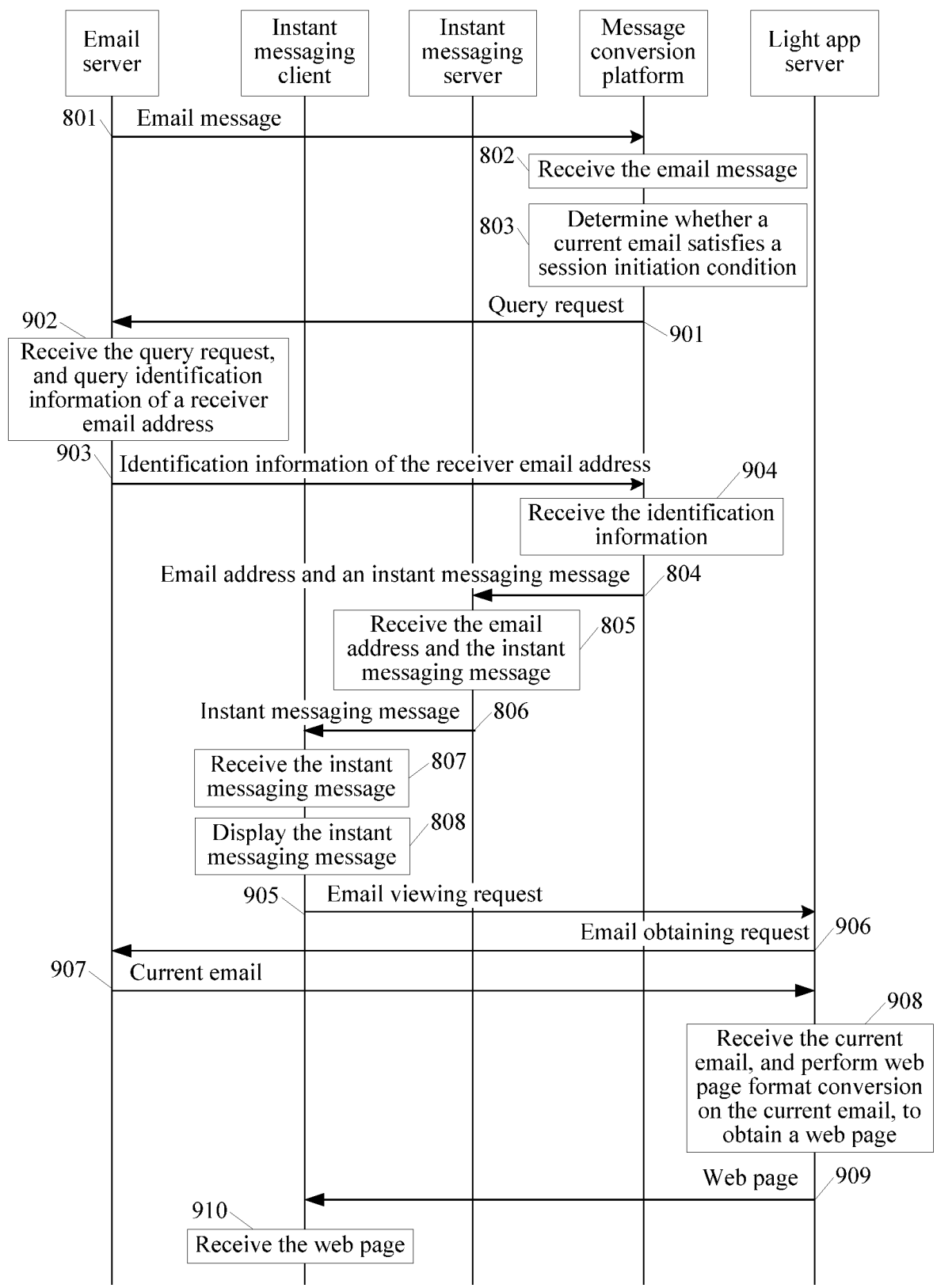
FIG. 9 is a schematic diagram of another information exchange method according to an embodiment of the present disclosure.

Referring to FIG. 9, FIG. 9 is a schematic diagram of another information exchange method according to an embodiment of the present disclosure. A solution set forth in FIG. 9 is obtained by partially modifying the solution set forth in FIG. 8. The following merely clarifies a part different from that in FIG. 8. For a same part, refer to the description in FIG. 8. As shown in FIG. 9, the information exchange method includes the following steps.

901: The message conversion platform sends a query request carrying the receiver email address to the email server, where the query request is used to request the email server to query identification information of the receiver email address, and the email server stores the identification information of the receiver email address.

902: The email server receives the query request, and queries the identification information of the receiver email address.

In this embodiment, the email server may allocate identification information to each email address, and the identification information of each email address is unique. For example, when each email address is logged in to the email server, the email server allocates identification information to the email address. In addition, the identification information herein may be further understood as a token for identity authentication.

903: The email server sends the identification information of the receiver email address to the message conversion platform.

904: The message conversion platform receives the identification information that is of the receiver email address and that is returned by the email server in response to the query request.

In addition, in this embodiment, the instant messaging message sent by the message conversion platform to the instant messaging server in step 803 may carry the identification information of the receiver email address. In this way, an instant messaging client in to which the receiver instant messaging account is logged can extract the identification information of the receiver email address from the instant messaging message, the instant messaging client sends, to a light app server, an email viewing request carrying the identification information of the receiver email address and the receiver email address, and the instant messaging client receives a web page that is converted from the current email and that is returned by the light app server in response to the email viewing request, where the web page is a web page obtained by the light app server by performing web page format conversion on the current email obtained from the email server, and the light app server obtains the current email from the email server by using the identification information of the receiver email address and the receiver email address. The current email herein is the current email in step 801.

By means of the foregoing steps, the instant messaging client can obtain, by using the instant messaging message, the web page converted from the email. In this way, the instant messaging client can obtain all content of the email.

The foregoing merely describes that the message conversion platform queries the email server for the identification information of the receiver email address. In some embodiments, the message conversion platform may further query the email server for identification information of the sender email address. For example, the query request in step 901 carries identification information of the sender email address. In this way, the identification information of the sender email address can be found.

In some implementations, the instant messaging message received by the instant messaging client may carry identification information of a target email address, and the target email address is an email address bound to an instant messaging account logged in to the instant messaging client. That is, the target email address herein may be the sender email address or the receiver email address because the instant messaging client may be an instant messaging client in to which the sender instant messaging account or the receiver instant messaging account is logged.

In this implementation, the method may further include the following steps.

905: The instant messaging client extracts the identification information from the instant messaging message, and sends an email viewing request carrying the identification information and the target email address to a light app server.

By means of step 905, the light app server may obtain the current email from the email server by using the identification information and the email address, and perform web page format conversion on the current email, to obtain a web page converted from the current email. For a specific implementation process of the light app server, refer to step 906, step 907, and step 908.

The light app server is a server for providing a service to a light app. The light app is a full-function application program that does not need to be downloaded and that can be used as being found. In step 905, it may be that the instant messaging client extracts the identification information from the instant messaging message, and calls a light app to send the email viewing request carrying the identification information and the target email address to the light app server. In addition, the instant messaging client and the light app may be installed in a same communications terminal. Therefore, the instant messaging client may send the email viewing request to the light app server by using the light app.

906: The light app server sends an email obtaining request to the email server, where the email obtaining request carries the identification information and the target email address, and the email obtaining request is used to obtain the current email from the email server.

907: The email server sends the current email to the light app server in response to the email obtaining request.

908: The light app server receives the current email sent by the email server, and performs web page format conversion on the current email, to obtain a web page converted from the current email.

In step 908, the current email may be converted into a web page of a Hypertext Markup Language (HTML) format that can be accessed by a browser. The web page may alternatively be an HTML version 5 (HTML5) static page or a JavaScript (js) dynamic script page. In addition, the web page may include all content such as the sender email address, the receiver email address, a title, text, a logo, an attachment, a table, and a signature in the current email.

909: The light app server sends the web page to the instant messaging client.

910: The instant messaging client receives the web page that is converted from the current email and that is returned by the light app server in response to the email viewing request.

Figure 10:
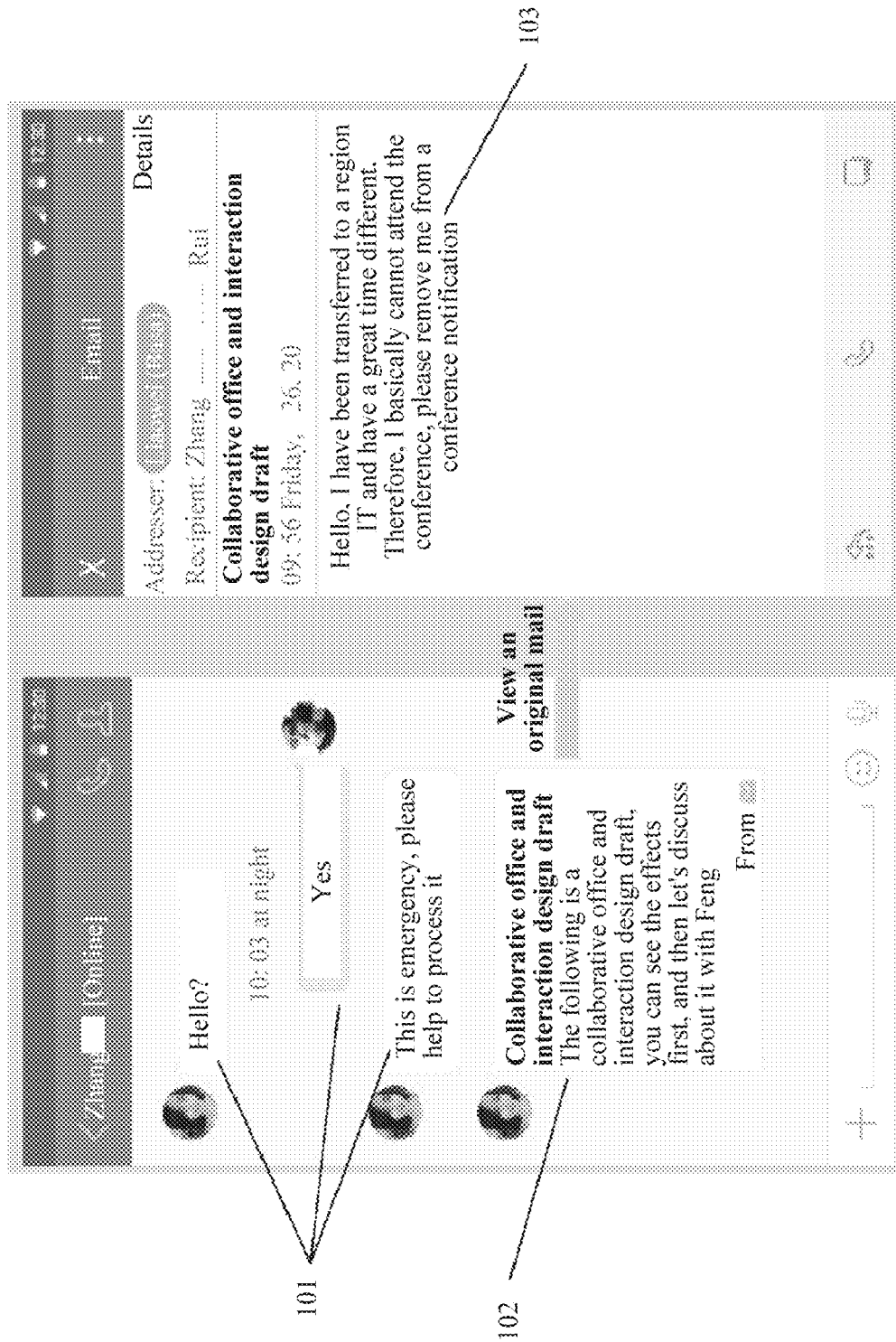
FIG. 10 is a schematic diagram of another email interface and another instant messaging interface according to an embodiment of the present disclosure.

By means of the foregoing steps, the instant messaging client can obtain, by using the instant messaging message, the web page converted from the email. In this way, the instant messaging client can obtain all content of the email. For example, as shown in FIG. 10, a session is included in FIG. 10. The session includes a common instant messaging message 101 communicated between instant messaging accounts, and may further include an instant messaging message 102 including email description information. When a user clicks the instant messaging message including the email description information, step 906 to step 910 may be performed, so that the web page, that is, an email 103 of a web page form in FIG. 10, is displayed on the instant messaging client.

In addition, by means of the steps, the instant messaging client can obtain the email without logging in to the email server, so as to improve exchange efficiency of the email.

In another embodiment, step 804 may include sending, by the message conversion platform, a session creation request carrying the email address to the instant messaging server, where the session creation request is used to request the instant messaging server to create a session including the sender instant messaging account and the receiver instant messaging account; and sending, by the message conversion platform, the instant messaging message including the email description information to the instant messaging server, where the instant messaging message is used to enable the instant messaging server to send the instant messaging message in the session.

It should be noted that this embodiment may be combined with the embodiment shown in FIG. 9 for implementation, or may be separated from the embodiment shown in FIG. 9 for independent implementation.

In this embodiment, after receiving the session creation request, the instant messaging server may identify the sender instant messaging account and the receiver instant messaging account according to the email address in the session creation request, so as to create the session. In addition, when receiving the instant messaging message, the instant messaging server may send the instant messaging message in the session, so that an instant messaging client in to which the receiver instant messaging account or the sender instant messaging account is logged can receive the instant messaging message.

In addition, in some embodiments, the method may further include the following steps: receiving, by the message conversion platform, instant messaging information sent by the instant messaging client, where the instant messaging information is included in the instant messaging message transmitted in the session; and generating, by the message conversion platform, an email including the instant messaging information, and sending the email including the instant messaging information to the email server.

The instant messaging message transmitted in the session may include the instant messaging message sent by the sender instant messaging account in the session, and may further include an instant messaging message sent by the receiver instant messaging account in the session. In addition, a receiver email address of the email sent to the email server may be the same as or different from the receiver email address of the current email. Alternatively, a receiver email address of the email sent to the email server may be some email addresses in the email addresses of the current email. For example, an email address not bound to an instant messaging account exists in the receiver email addresses of the current email. In this way, the instant messaging message in the session may be sent to the email address not bound to an instant messaging account.

It should be noted that this implementation may alternatively be implemented in the embodiment shown in FIG. 8.

In the embodiments of the present disclosure, by means of the foregoing embodiment, regardless of whether the session is created in a point-to-point manner or in a temporary-group (or a group) manner, the message conversion platform can send the instant messaging message including the email description information to a user in a timely manner. The user may continue a discussion in an instant messaging manner in context of the existing instant messaging message, to implement smooth transition between the email and the instant messaging message.

In addition, instant messaging chat information cannot be reversely transmitted to an email system, that is, content in an instant messaging chat of a user is not seen in an email. In addition, a recipient email address and a carbon copy email address in the email are equally treated in a rule and can both receive the instant messaging message including the email description information provided that the email address is bound to an instant messaging account.

In addition, other internal data such as a picture, an attachment, or a table in the email can be viewed as long as the instant messaging message is clicked, so that an application scenario of viewing email content in instant messaging is improved.

In addition, the user may further close a session window in the instant messaging client to end a local session. However, if any one of two message parties sends a message again, the session is re-displayed. The session may further carry historical data, so as to help the user to query historical chat information in the past.

Figure 11A:
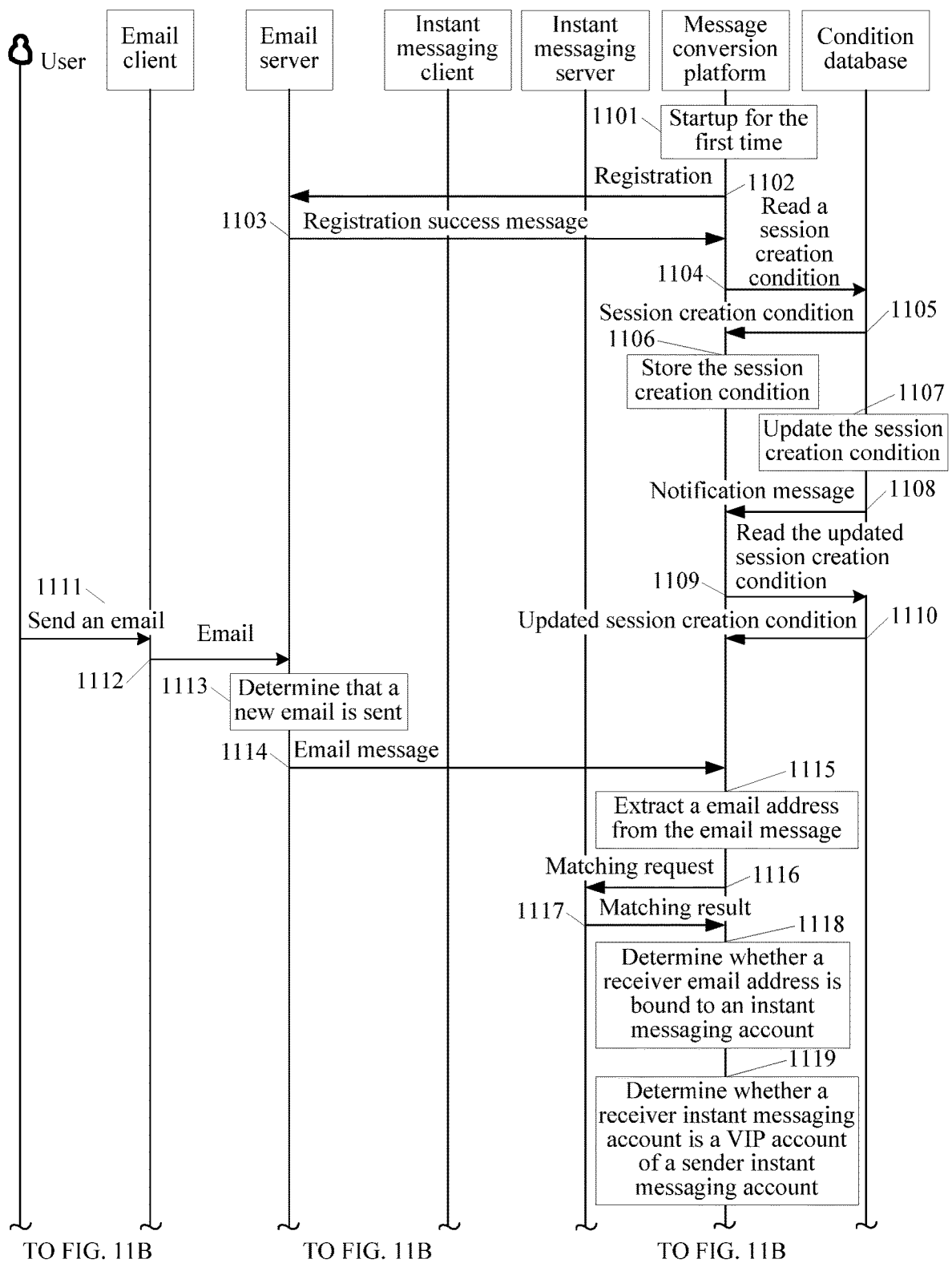
FIG. 11A and FIG. 11B are a schematic diagram of another information exchange method according to an embodiment of the present disclosure.
Figure 11B:
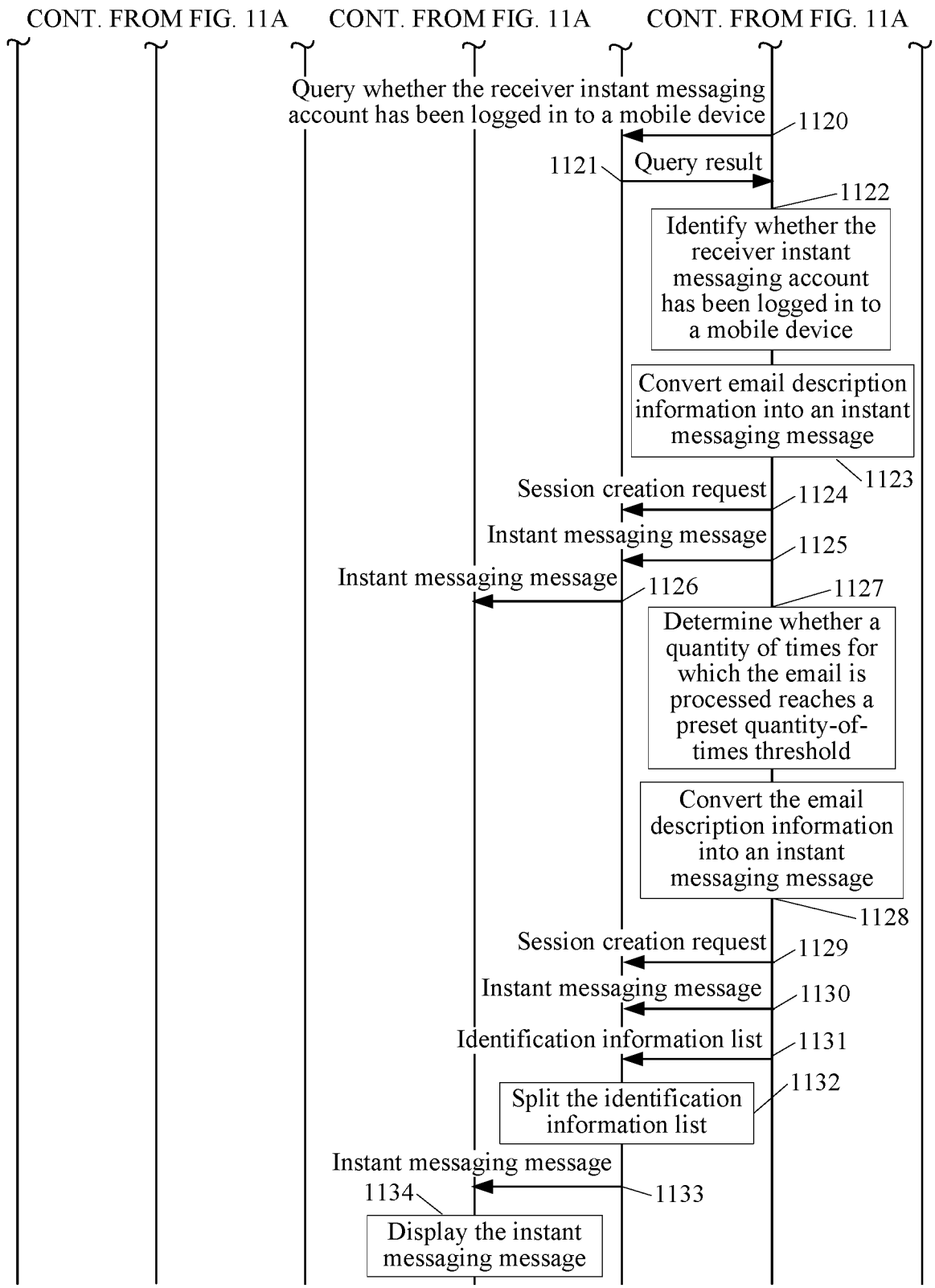

Referring to FIG. 11A and FIG. 11B, FIG. 11A and FIG. 11B are a schematic diagram of another information exchange method according to an embodiment of the present disclosure. As shown in FIG. 11A and FIG. 11B, the information exchange method includes the following steps.

1101: Start a message conversion platform for the first time.

1102: The message conversion platform registers with an email server.

The registration herein may be understood as that the message conversion platform applies the email server for authentication, an email forwarding permission, or the like.

1103: The email server returns a registration success message to the message conversion platform.

1104: The message conversion platform reads a session creation condition from a condition database.

1105: The condition database returns the session creation condition to the message conversion platform.

1106: The message conversion platform stores the session creation condition.

1107: The condition database updates the session creation condition.

1108: The condition database sends, to the message conversion platform, a notification message indicating that the session creation condition is updated.

1109: The message conversion platform reads the updated session creation condition from the condition database.

1110: The condition database returns the updated session creation condition to the message conversion platform.

It should be noted that step 1101 to step 1110 are all optional steps. The email server may send an email to the message conversion platform by default, and the session creation condition may be internally configured in the message conversion platform.

1111. A user sends an email.

1112: An email client sends, to the email server, the email sent by the user.

1113: The email server determines that a new email is sent.

1114: The email server sends an email message to the message conversion platform, where the email message includes an email address and email description information of the received email.

1115. The message conversion platform extracts the email address from the email message.

1116: The message conversion platform sends an instant messaging account matching request to an instant messaging server, where the matching request includes the email address.

1117: The message conversion platform receives a matching result returned by the instant messaging server, where the matching result may indicate an email address of an instant messaging account bound to the email address, for example, indicate that four email addresses are all bound to an instant messaging account, or indicate that three of the four email addresses are bound to an instant messaging account; certainly, the matching result herein may further carry an online status of the bound instant messaging account.

1118: The message conversion platform determines whether a receiver email address is bound to an instant messaging account.

1119: When the receiver email address is bound to an instant messaging account, the message conversion platform determines whether a receiver instant messaging account is a VIP account of a sender instant messaging account.

1120: When the receiver instant messaging account is a VIP account, the message conversion platform queries the instant messaging server for whether the receiver instant messaging account has been logged in to a mobile device.

1121: The message conversion platform receives a query result returned by the instant messaging server.

1122: The message conversion platform identifies, by using the query result, whether the receiver instant messaging account has been logged in to a mobile device.

1123: When the receiver instant messaging account has been logged in to a mobile device, the message conversion platform converts the email description information into an instant messaging message, that is, generates an instant messaging message including the email description information.

1124: The message conversion platform sends a session creation request to the instant messaging server.

1125: The message conversion platform sends the instant messaging message to the instant messaging server.

1126: An instant messaging server sends the instant messaging message to an instant messaging client.

In addition, the method may further include the following steps according to different session creation conditions.

1127: The message conversion platform determines whether a quantity of times for which the email is processed reaches a preset quantity-of-times threshold.

1128: When the quantity of times for which the email is processed reaches the preset quantity-of-times threshold, the message conversion platform converts the email description information into an instant messaging message, that is, generates an instant messaging message including the email description information.

1129: The message conversion platform sends a session creation request to the instant messaging server.

1130: The message conversion platform sends the instant messaging message to the instant messaging server.

1131: The message conversion platform sends an identification information list to the instant messaging server, where the identification information list may include identification information of an email address bound to each instant messaging account included in the session.

1132: The instant messaging server splits the identification information list.

1133: An instant messaging server sends the instant messaging message to an instant messaging client, where the instant messaging message herein includes the identification information of the email address bound to each instant messaging account; the instant messaging client herein may obtain respective identification information, and use the identification information to obtain, from a light app server, a web page converted from the email.

1134: The instant messaging client displays the instant messaging message.

Figure 12:
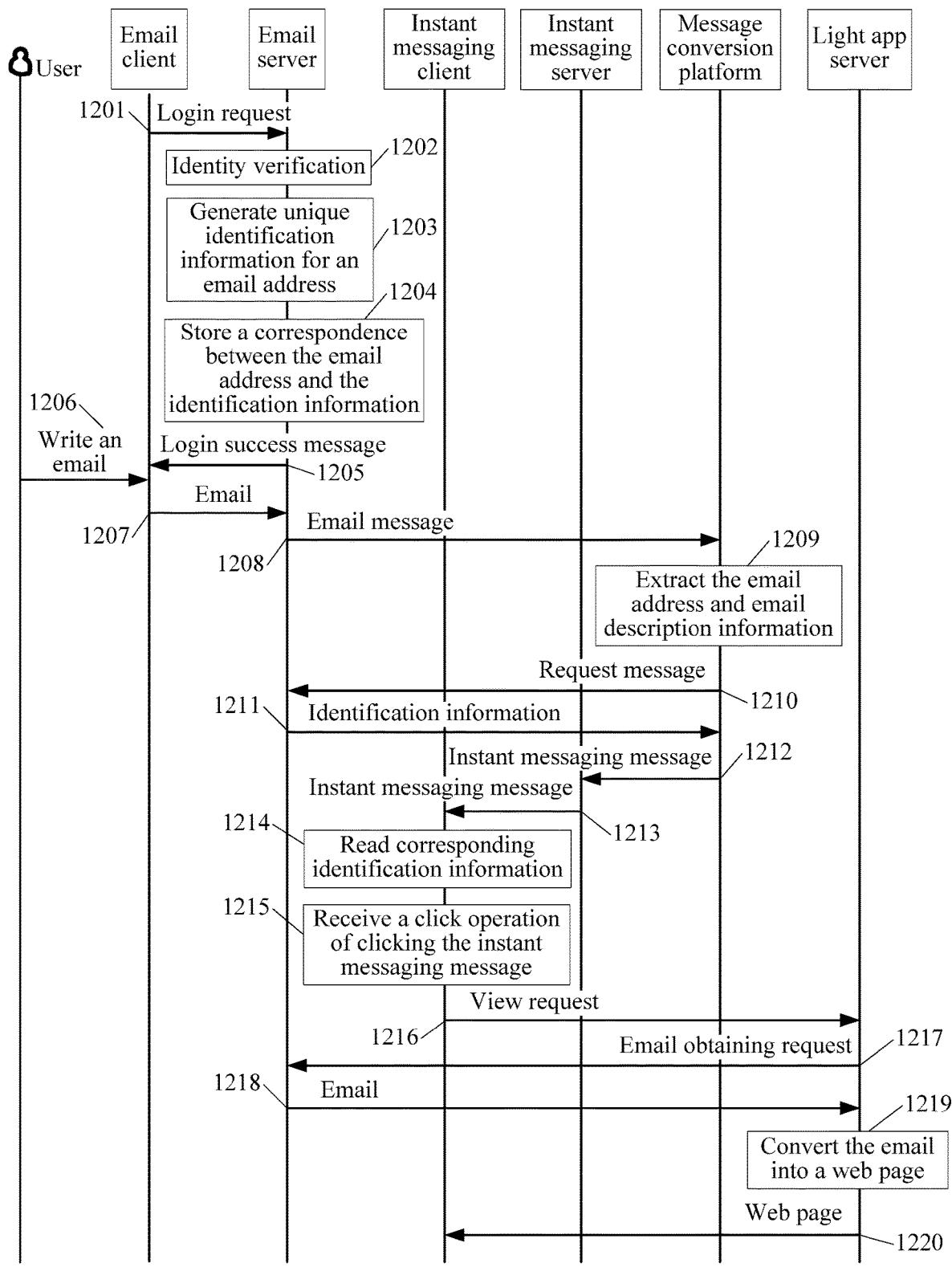
FIG. 12 is a schematic diagram of another information exchange method according to an embodiment of the present disclosure.

Referring to FIG. 12, FIG. 12 is a schematic diagram of another information exchange method according to an embodiment of the present disclosure. As shown in FIG. 12, the information exchange method includes the following steps.

1201: An email client sends a login request to an email server, where the login request includes an email address and a password.

1202: The email server performs identity verification.

1203: When the identity verification succeeds, the email server generates unique identification information for the email address.

1204: The email server stores a correspondence between the email address and the identification information.

1205: The email server returns a login success message to the email client.

1206. A user writes an email.

1207: The email client sends the email to the email server.

1208: The email server sends an email message to a message conversion platform, where the email message includes the email address and email description information.

1209: The message conversion platform extracts the email address and the email description information from an email message.

1210: The message conversion platform sends, to the email server, a request message for obtaining the identification information of the email address.

1211: The email server sends the identification information of the email address to the message conversion platform.

1212: The message conversion platform sends an instant messaging message to an instant messaging server, where the instant messaging message includes the identification information of the email address and the email description information.

1213: The instant messaging server sends the instant messaging message to an instant messaging client.

1214: The instant messaging client reads corresponding identification information, where the corresponding identification information is identification information of an email address bound to an instant messaging account logged in to the instant messaging client.

1215: The instant messaging client receives a click operation of clicking the instant messaging message.

1216: The instant messaging client sends a view request to a light app server for viewing the email, where the query request includes the email address bound to the instant messaging account logged in to the instant messaging client and the corresponding identification information.

1217: The light app server sends an email obtaining request to the email server, where the request includes the email address bound to the instant messaging account logged in to the instant messaging client and the corresponding identification information.

1218: The email server returns the email to the light app server in response to the email obtaining request, where the email herein is the email sent in step 1207.

1219: The light app server converts the email into a web page.

1220: The light app server returns the web page to the instant messaging client.

Figure 13:
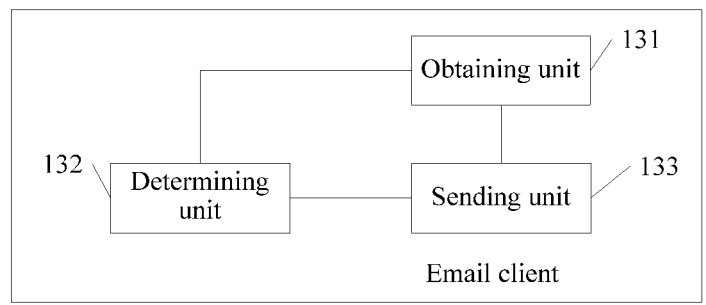
FIG. 13 is a schematic structural diagram of an email client according to an embodiment of the present disclosure.

Referring to FIG. 13, FIG. 13 is a schematic structural diagram of an email client according to an embodiment of the present disclosure. As shown in FIG. 13, the email client includes an obtaining unit 131, a determining unit 132, and a sending unit 133.

The obtaining unit 131 is configured to obtain a receiver email address and email description information of a current email, where a sender email address of the current email is logged in to the email client.

The determining unit 132 is configured to determine whether an instant messaging account bound to the receiver email address satisfies a pre-stored session initiation condition.

The sending unit 133 is configured to when the determining unit 132 determines that the instant messaging account bound to the receiver email address satisfies the session initiation condition, send the receiver email address and the email description information to an instant messaging client in to which a sender instant messaging account is logged, so that the instant messaging client requests an instant messaging server to create a session including the sender instant messaging account and a receiver instant messaging account, and the instant messaging client sends, in the session, an instant messaging message including the email description information, where the sender instant messaging account is an instant messaging account bound to the sender email address, and the receiver instant messaging account is the instant messaging account bound to the receiver email address.

Figure 14:
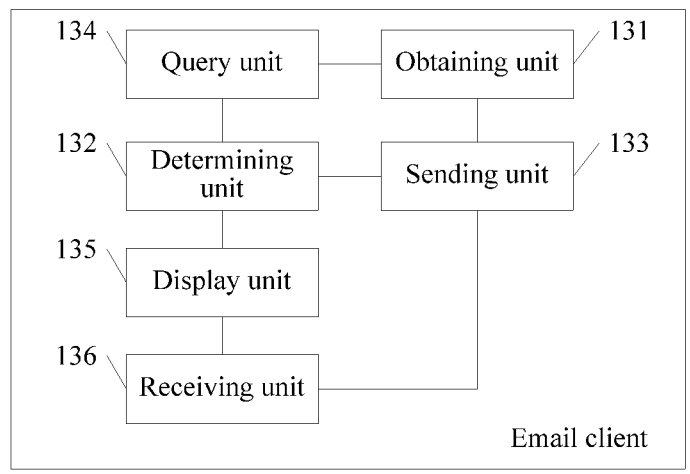
FIG. 14 is a schematic structural diagram of another email client according to an embodiment of the present disclosure.

Optionally, as shown in FIG. 14, the email client may further include a query unit 134 configured to query an online status of the instant messaging account bound to the receiver email address.

The determining unit 132 may be configured to determine whether the online status satisfies the pre-stored session initiation condition.

The sending unit 133 may be configured to when the determining unit determines that the online status satisfies the session initiation condition, send the receiver email address and the email description information to the instant messaging client in to which the sender instant messaging account is logged.

In this implementation, the email client may further include a display unit 135 configured to when the determining unit determines that the online status satisfies the session initiation condition, display an initiation button for session initiation; and a receiving unit 136 configured to receive a session initiation command that is entered by a user by using the initiation button.

The sending unit 133 may be configured to send, in response to the session initiation command, the receiver email address and the email description information to the instant messaging client in to which the sender instant messaging account is logged.

In this implementation, the receiver email address may include at least one email address, and at least one of the email address included in the receiver email address is bound to an instant messaging account.

The session initiation condition may include an online instant messaging account exists in the instant messaging account bound to the email address included in the receiver email address; or a quantity of online instant messaging accounts in the instant messaging account bound to the email address included in the receiver email address exceeds a preset quantity threshold; or a proportion of online instant messaging accounts in the instant messaging account bound to the email address included in the receiver email address exceeds a preset proportion threshold; or an instant messaging account currently logged in to a mobile terminal exists in the instant messaging account bound to the email address included in the receiver email address; or a quantity of instant messaging accounts currently logged in to a mobile terminal device in the instant messaging account bound to the email address included in the receiver email address exceeds a preset quantity threshold.

Figure 15:
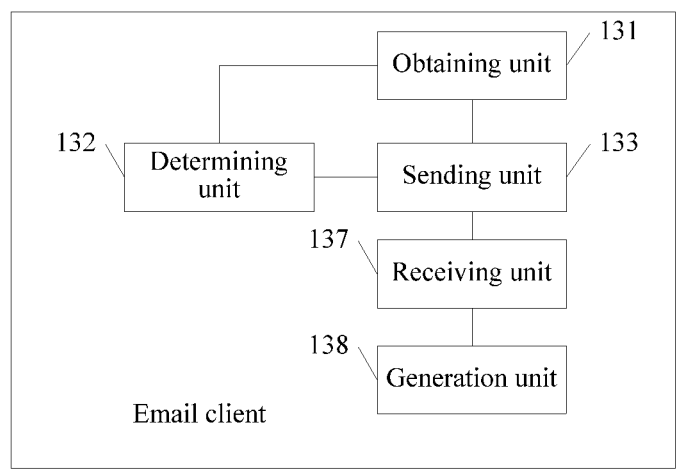
FIG. 15 is a schematic structural diagram of an instant messaging client according to an embodiment of the present disclosure.

In this embodiment, as shown in FIG. 15, the email client may further include a receiving unit 137 configured to receive instant messaging information sent by the instant messaging client, where the instant messaging information is included in the instant messaging message transmitted in the session; and a generation unit 138 configured to generate an email including the instant messaging information, and send the email including the instant messaging information to an email server.

It should be noted that the email client in this embodiment may be any email client described in the embodiments shown in FIG. 1 to FIG. 12, and the implementations of the email clients described in the embodiments shown in FIG. 1 to FIG. 12 may all be implemented by the email client in this embodiment.

In this embodiment, exchange efficiency of email information can be improved.

Figure 16:
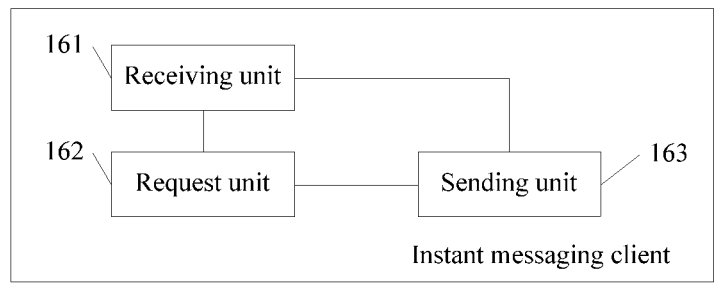
FIG. 16 is a schematic structural diagram of an information exchange apparatus according to an embodiment of the present disclosure.

Referring to FIG. 16, FIG. 16 is a schematic structural diagram of an instant messaging client according to an embodiment of the present disclosure. As shown in FIG. 16, the instant messaging client includes a receiving unit 161, a request unit 162, and a sending unit 163.

The receiving unit 161 is configured to receive a receiver email address and email description information that are sent by an email client, where the receiver email address and the email description information are a receiver email address and email description information of a current email of the email client, a sender email address of the current email is logged in to the email client, and a sender instant messaging account bound to the sender email address is logged in to the instant messaging client.

The request unit 162 is configured to send a session creation request to an instant messaging server, where the session creation request is used to request for creating a session including the sender instant messaging account and a receiver instant messaging account, the receiver instant messaging account is an instant messaging account bound to the receiver email address, and the session creation request carries the receiver email address.

The receiving unit 161 is further configured to receive a session creation response message returned by the instant messaging server in response to the session creation request.

The sending unit 163 is configured to send, in the session, an instant messaging message including the email description information.

Optionally, the receiving unit 161 may be further configured to receive a first query request that is sent by the email client and that carries the receiver email address, where the first query request is used to query an online status of the instant messaging account bound to the receiver email address.

The sending unit 163 may be further configured to obtain the receiver email address carried in the first query request, and send a second query request carrying the receiver email address to the instant messaging server, where the second query request is used to query the online status of the instant messaging account bound to the receiver email address.

The receiving unit 161 may be further configured to receive status information that is of the online status of the instant messaging account bound to the receiver email address and that is returned by the instant messaging server in response to the second query request.

The sending unit 163 is further configured to send the status information to the email client, so that the email client sends the receiver email address and the email description information to the instant messaging client when determining, by using the status information, that the instant messaging account bound to the receiver email address satisfies a pre-stored session initiation condition.

It should be noted that the instant messaging client in this embodiment may be any instant messaging client described in the embodiments shown in FIG. 1 to FIG. 12, and the implementations of the instant messaging clients described in the embodiments shown in FIG. 1 to FIG. 12 may all be implemented by the instant messaging client in this embodiment.

In this embodiment, exchange efficiency of email information can be improved.

Figure 17:
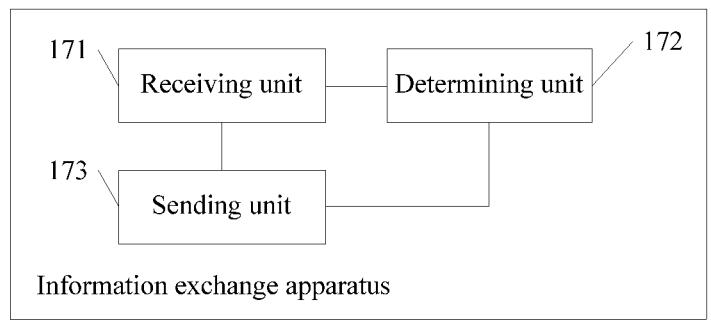
FIG. 17 is a schematic structural diagram of another information exchange apparatus according to an embodiment of the present disclosure.

Referring to FIG. 17, FIG. 17 is a schematic structural diagram of an information exchange apparatus according to an embodiment of the present disclosure. As shown in FIG. 17, the information exchange apparatus includes a receiving unit 171, a determining unit 172, and a sending unit 173.

The receiving unit 171 is configured to receive an email message sent by an email server, where the email message carries an email address and email description information of a current email, and the email address includes a sender email address and a receiver email address of the current email.

The determining unit 172 is configured to determine whether the current email satisfies a pre-stored session creation condition.

The sending unit 173 is configured to when the determining unit 172 determines that the current email satisfies the session creation condition, send the email address and an instant messaging message including the email description information to an instant messaging server, so that the instant messaging server sends the instant messaging message to a sender instant messaging account and a receiver instant messaging account by using the email address, where the sender instant messaging account is an instant messaging account bound to the sender email address, and the receiver instant messaging account is an instant messaging account bound to the receiver email address.

Optionally, the sending unit 173 may be configured to send a session creation request carrying the email address to the instant messaging server, where the session creation request is used to request the instant messaging server to create a session including the sender instant messaging account and the receiver instant messaging account.

The sending unit 173 may be further configured to send the instant messaging message including the email description information to the instant messaging server, where the instant messaging message is used to enable the instant messaging server to send the instant messaging message in the session.

Optionally, the receiver email address may include at least one email address, and at least one of the email address included in the receiver email address is bound to an instant messaging account.

The session creation condition may include an instant messaging account currently logged in to a mobile terminal exists in the instant messaging account bound to the email address included in the receiver email address; or a quantity of instant messaging accounts currently logged in to a mobile terminal device in the instant messaging account bound to the email address included in the receiver email address exceeds a preset quantity threshold; or a particular instant messaging account exists in the instant messaging account bound to the email address included in the receiver email address, where the particular instant messaging account is an instant messaging account having a particular relationship with the sender instant messaging account; or a quantity of particular instant messaging accounts in the instant messaging account bound to the email address included in the receiver email address exceeds a preset quantity threshold, where the particular instant messaging account is an instant messaging account having a particular relationship with the sender instant messaging account; or a quantity of times for which the current email is processed exceeds a preset quantity-of-times threshold, where the quantity of times for which the current email is processed includes a quantity of times for which the current email is forwarded, or the quantity of times for which the current email is processed includes a quantity of times for which the current email is replied, or the quantity of times for which the current email is processed includes a quantity of times for which the current email is forwarded and a quantity of times for which the current email is replied; or an online instant messaging account exists in the instant messaging account bound to the email address included in the receiver email address; or a quantity of online instant messaging accounts in the instant messaging account bound to the email address included in the receiver email address exceeds a preset quantity threshold; or a proportion of online instant messaging accounts in the instant messaging account bound to the email address included in the receiver email address exceeds a preset proportion threshold.

Optionally, the sending unit 173 may be further configured to send a query request carrying the receiver email address to the email server, where the query request is used to request the email server to query identification information of the receiver email address, and the email server stores the identification information of the receiver email address.

The receiving unit 171 may be further configured to receive the identification information that is of the receiver email address and that is returned by the email server in response to the query request.

The instant messaging message carries the identification information of the receiver email address, so that an instant messaging client in to which the receiver instant messaging account is logged extracts the identification information of the receiver email address from the instant messaging message, the instant messaging client sends, to a light app server, an email viewing request carrying the identification information of the receiver email address and the receiver email address, and the instant messaging client receives a web page that is converted from the current email and that is returned by the light app server in response to the email viewing request, where the web page is a web page obtained by the light app server by performing web page format conversion on the current email obtained from the email server, and the light app server obtains the current email from the email server by using the identification information of the receiver email address and the receiver email address.

It should be noted that the information exchange apparatus in this embodiment may be any message conversion platform described in the embodiments shown in FIG. 1 to FIG. 12, and the implementations of the message conversion platforms described in the embodiments shown in FIG. 1 to FIG. 12 may all be implemented by the information exchange apparatus in this embodiment.

In this embodiment, exchange efficiency of email information can be improved.

Figure 18:
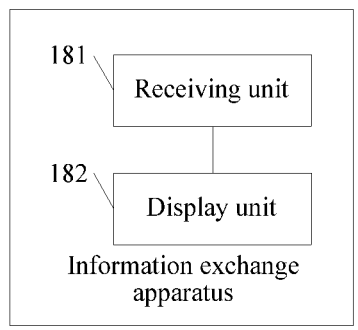
FIG. 18 is a schematic structural diagram of another information exchange apparatus according to an embodiment of the present disclosure.

Referring to FIG. 18, FIG. 18 is a schematic structural diagram of another information exchange apparatus according to an embodiment of the present disclosure. As shown in FIG. 18, the information exchange apparatus includes a receiving unit 181 and a display unit 182.

The receiving unit 181 is configured to receive an instant messaging message that includes email description information and that is sent by an instant messaging server, where the email description information is received by the instant messaging server and is sent by an message conversion platform, and is sent to the apparatus by using an email address sent by the message conversion platform; the email description information and the email address are received by the message conversion platform and are sent by an email server, and are email description information and an email address of a current email of the email server; a sender instant messaging account or a receiver instant messaging account is logged in to the apparatus, the sender instant messaging account is an instant messaging account bound to a sender email address included in the email address, and the receiver instant messaging account is an instant messaging account bound to a receiver email address included in the email address.

The display unit 182 is configured to display the instant messaging message.

Optionally, the instant messaging message may carry identification information of a target email address, and the target email address is an email address bound to an instant messaging account logged in to the apparatus.

Figure 19:
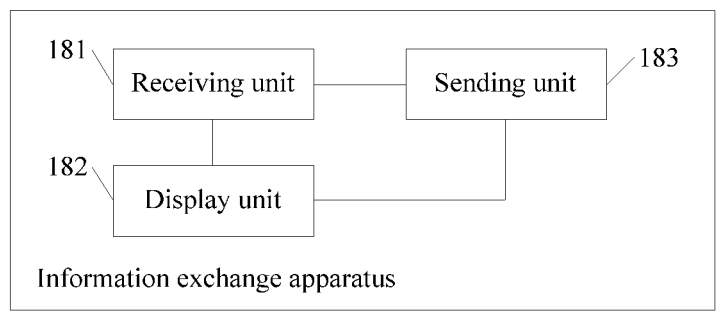
FIG. 19 is a schematic structural diagram of another information exchange apparatus according to an embodiment of the present disclosure.

As shown in FIG. 19, the apparatus may further include a sending unit 183 configured to extract the identification information from the instant messaging message, and send, to a light app server, an email viewing request carrying the identification information and the target email address, so that the light app server obtains the current email from the email server by using the identification information and the target email address, and performs web page format conversion on the current email, to obtain a web page converted from the current email.

The receiving unit 181 may be further configured to receive the web page that is converted from the current email and that is returned by the light app server in response to the email viewing request.

It should be noted that the information exchange apparatus in this embodiment may be any instant messaging client described in the embodiments shown in FIG. 1 to FIG. 12, and the implementations of the instant messaging clients described in the embodiments shown in FIG. 1 to FIG. 12 may all be implemented by the information exchange apparatus in this embodiment.

In this embodiment, exchange efficiency of email information can be improved.

Figure 20:
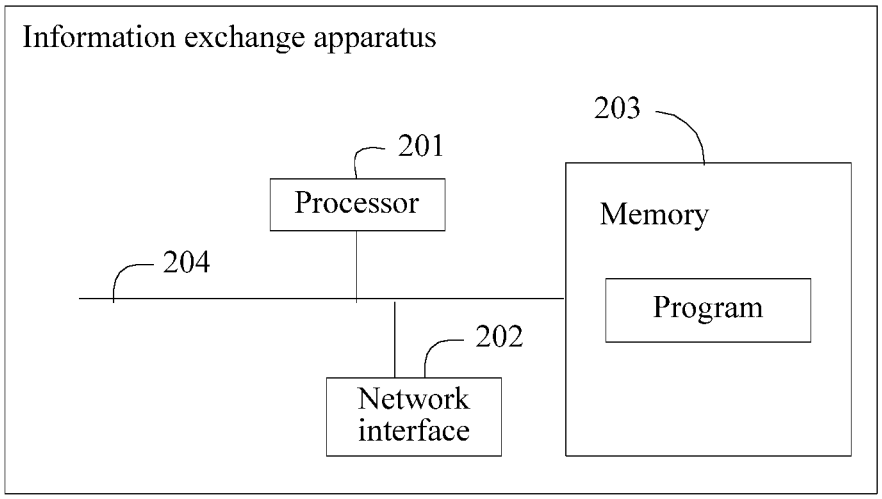
FIG. 20 is a schematic structural diagram of another information exchange apparatus according to an embodiment of the present disclosure.

Referring to FIG. 20, FIG. 20 is a schematic structural diagram of another information exchange apparatus according to an embodiment of the present disclosure. As shown in FIG. 20, the information exchange apparatus includes a processor 201, a network interface 202, a memory 203, and a communications bus 204. The communications bus 204 is configured to implement connection and communication between the processor 201, the network interface 202, and the memory 203, and the processor 201 performs a program stored in the memory 203 to implement the following method: obtaining a receiver email address and email description information of a current email, where a sender email address of the current email is logged in to the apparatus; determining whether an instant messaging account bound to the receiver email address satisfies a pre-stored session initiation condition; and if the instant messaging account bound to the receiver email address satisfies the session initiation condition, sending the receiver email address and the email description information to an instant messaging client in to which a sender instant messaging account is logged, so that the instant messaging client requests an instant messaging server to create a session including the sender instant messaging account and a receiver instant messaging account, and the instant messaging client sends, in the session, an instant messaging message including the email description information, where the sender instant messaging account is an instant messaging account bound to the sender email address, and the receiver instant messaging account is the instant messaging account bound to the receiver email address.

Optionally, the program executed by the processor 201 may further include querying an online status of the instant messaging account bound to the receiver email address.

The program that is executed by the processor 201 and that is of determining whether an instant messaging account bound to the receiver email address satisfies a pre-stored session initiation condition may include determining whether the online status satisfies the pre-stored session initiation condition.

Optionally, the program executed by the processor 201 may further include when it is determined that the online status satisfies the session initiation condition, displaying an initiation button for session initiation; and receiving a session initiation command that is entered by a user by using the initiation button.

The program that is executed by the processor 201 and that is of sending the receiver email address and the email description information to an instant messaging client in to which a sender instant messaging account is logged may include sending, in response to the session initiation command, the receiver email address and the email description information to the instant messaging client in to which the sender instant messaging account is logged.

Optionally, the receiver email address may include at least one email address, and at least one of the email address included in the receiver email address is bound to an instant messaging account.

The session initiation condition may include an online instant messaging account exists in the instant messaging account bound to the email address included in the receiver email address; or a quantity of online instant messaging accounts in the instant messaging account bound to the email address included in the receiver email address exceeds a preset quantity threshold; or a proportion of online instant messaging accounts in the instant messaging account bound to the email address included in the receiver email address exceeds a preset proportion threshold; or an instant messaging account currently logged in to a mobile terminal exists in the instant messaging account bound to the email address included in the receiver email address; or a quantity of instant messaging accounts currently logged in to a mobile terminal device in the instant messaging account bound to the email address included in the receiver email address exceeds a preset quantity threshold.

Optionally, the program executed by the processor 201 may further include receiving instant messaging information sent by the instant messaging client, where the instant messaging information is included in the instant messaging message transmitted in the session; and generating an email including the instant messaging information, and sending the email including the instant messaging information to an email server.

It should be noted that the information exchange apparatus in this embodiment may be installed on the email clients described in the embodiments shown in FIG. 1 to FIG. 12, and the implementations of the email clients described in the embodiments shown in FIG. 1 to FIG. 12 may all be implemented by the information exchange apparatus in this embodiment.

In this embodiment, exchange efficiency of email information can be improved.

Figure 21:
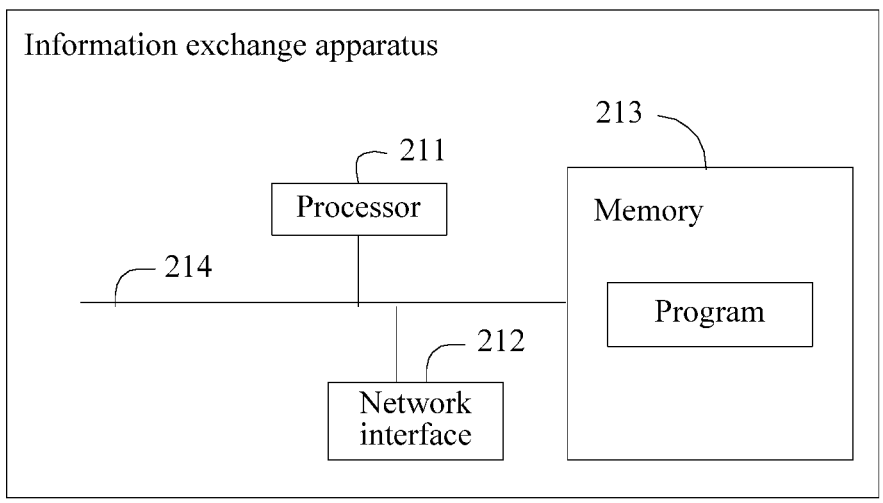
FIG. 21 is a schematic structural diagram of another information exchange apparatus according to an embodiment of the present disclosure.

Referring to FIG. 21, FIG. 21 is a schematic structural diagram of another information exchange apparatus according to an embodiment of the present disclosure. As shown in FIG. 21, the information exchange apparatus a processor 211, a network interface 212, a memory 213, and a communications bus 214. The communications bus 214 is configured to implement connection and communication between the processor 211, the network interface 212, and the memory 213, and the processor 211 performs a program stored in the memory 213 to implement the following method: receiving a receiver email address and email description information that are sent by an email client, where the receiver email address and the email description information are a receiver email address and email description information of a current email of the email client, a sender email address of the current email is logged in to the email client, and a sender instant messaging account bound to the sender email address is logged in to the apparatus; sending a session creation request to an instant messaging server, where the session creation request is used to request for creating a session including the sender instant messaging account and a receiver instant messaging account, the receiver instant messaging account is an instant messaging account bound to the receiver email address, and the session creation request carries the receiver email address; and receiving a session creation response message returned by the instant messaging server in response to the session creation request, and sending, in the session, an instant messaging message including the email description information.

Optionally, the program executed by the processor 211 may further include receiving a first query request that is sent by the email client and that carries the receiver email address, where the first query request is used to query an online status of the instant messaging account bound to the receiver email address; obtaining the receiver email address carried in the first query request, and sending a second query request carrying the receiver email address to the instant messaging server, where the second query request is used to query the online status of the instant messaging account bound to the receiver email address; and receiving status information that is of the online status of the instant messaging account bound to the receiver email address and that is returned by the instant messaging server in response to the second query request, and sending the status information to the email client, so that the email client sends the receiver email address and the email description information to the instant messaging client when determining, by using the status information, that the instant messaging account bound to the receiver email address satisfies a pre-stored session initiation condition.

It should be noted that the information exchange apparatus in this embodiment may be installed on any instant messaging client described in the embodiments shown in FIG. 1 to FIG. 12, and the implementations of the instant messaging clients described in the embodiments shown in FIG. 1 to FIG. 12 may all be implemented by the information exchange apparatus in this embodiment.

In this embodiment, exchange efficiency of email information can be improved.

Figure 22:
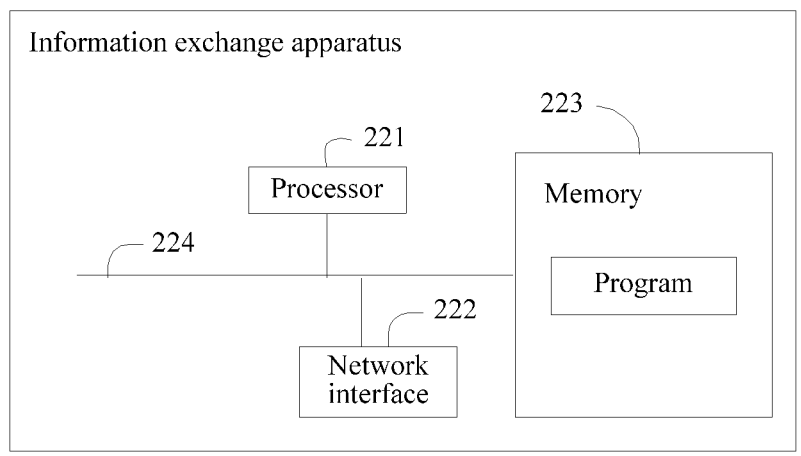
FIG. 22 is a schematic structural diagram of another information exchange apparatus according to an embodiment of the present disclosure.

Referring to FIG. 22, FIG. 22 is a schematic structural diagram of another information exchange apparatus according to an embodiment of the present disclosure. As shown in FIG. 22, the information exchange apparatus a processor 221, a network interface 222, a memory 223, and a communications bus 224. The communications bus 224 is configured to implement connection and communication between the processor 221, the network interface 222, and the memory 223, and the processor 221 performs a program stored in the memory 223 to implement the following method: receiving an email message sent by an email server, where the email message carries an email address and email description information of a current email, and the email address includes a sender email address and a receiver email address of the current email; determining whether the current email satisfies a pre-stored session creation condition; and if the current email satisfies the session creation condition, sending the email address and an instant messaging message including the email description information to an instant messaging server, so that the instant messaging server sends the instant messaging message to a sender instant messaging account and a receiver instant messaging account by using the email address, where the sender instant messaging account is an instant messaging account bound to the sender email address, and the receiver instant messaging account is an instant messaging account bound to the receiver email address.

Optionally, the program that is executed by the processor 221 and that is of sending the email address and an instant messaging message including the email description information to an instant messaging server may include sending a session creation request carrying the email address to the instant messaging server, where the session creation request is used to request the instant messaging server to create a session including the sender instant messaging account and the receiver instant messaging account; and sending the instant messaging message including the email description information to the instant messaging server, where the instant messaging message is used to enable the instant messaging server to send the instant messaging message in the session.

Optionally, the receiver email address may include at least one email address, and at least one of the email address included in the receiver email address is bound to an instant messaging account.

The session creation condition may include an instant messaging account currently logged in to a mobile terminal exists in the instant messaging account bound to the email address included in the receiver email address; or a quantity of instant messaging accounts currently logged in to a mobile terminal device in the instant messaging account bound to the email address included in the receiver email address exceeds a preset quantity threshold; or a particular instant messaging account exists in the instant messaging account bound to the email address included in the receiver email address, where the particular instant messaging account is an instant messaging account having a particular relationship with the sender instant messaging account; or a quantity of particular instant messaging accounts in the instant messaging account bound to the email address included in the receiver email address exceeds a preset quantity threshold, where the particular instant messaging account is an instant messaging account having a particular relationship with the sender instant messaging account; or a quantity of times for which the current email is processed exceeds a preset quantity-of-times threshold, where the quantity of times for which the current email is processed includes a quantity of times for which the current email is forwarded, or the quantity of times for which the current email is processed includes a quantity of times for which the current email is replied, or the quantity of times for which the current email is processed includes a quantity of times for which the current email is forwarded and a quantity of times for which the current email is replied; or an online instant messaging account exists in the instant messaging account bound to the email address included in the receiver email address; or a quantity of online instant messaging accounts in the instant messaging account bound to the email address included in the receiver email address exceeds a preset quantity threshold; or a proportion of online instant messaging accounts in the instant messaging account bound to the email address included in the receiver email address exceeds a preset proportion threshold.

Optionally, the program executed by the processor 221 may further include sending a query request carrying the receiver email address to the email server, where the query request is used to request the email server to query identification information of the receiver email address, and the email server stores the identification information of the receiver email address; and receiving the identification information that is of the receiver email address and that is returned by the email server in response to the query request.

The instant messaging message carries the identification information of the receiver email address, so that an instant messaging client in to which the receiver instant messaging account is logged extracts the identification information of the receiver email address from the instant messaging message, the instant messaging client sends, to a light app server, an email viewing request carrying the identification information of the receiver email address and the receiver email address, and the instant messaging client receives a web page that is converted from the current email and that is returned by the light app server in response to the email viewing request, where the web page is a web page obtained by the light app server by performing web page format conversion on the current email obtained from the email server, and the light app server obtains the current email from the email server by using the identification information of the receiver email address and the receiver email address.

Optionally, the program executed by the processor 221 may further include receiving instant messaging information sent by the instant messaging client, where the instant messaging information is included in the instant messaging message transmitted in the session; and generating an email including the instant messaging information, and sending the email including the instant messaging information to the email server.

It should be noted that the information exchange apparatus in this embodiment may be any message conversion platform described in the embodiments shown in FIG. 1 to FIG. 12, and the implementations of the message conversion platforms described in the embodiments shown in FIG. 1 to FIG. 12 may all be implemented by the information exchange apparatus in this embodiment.

In this embodiment, exchange efficiency of email information can be improved.

Figure 23:
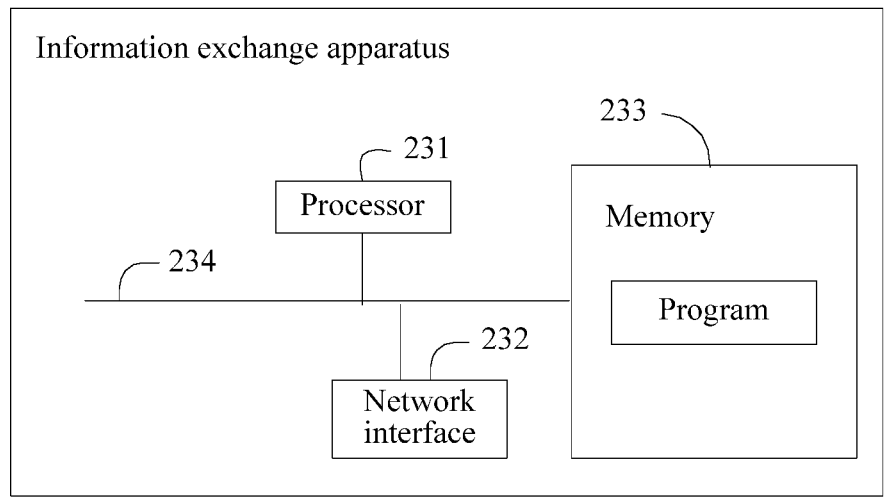
FIG. 23 is a schematic structural diagram of another information exchange apparatus according to an embodiment of the present disclosure.

Referring to FIG. 23, FIG. 23 is a schematic structural diagram of another information exchange apparatus according to an embodiment of the present disclosure. As shown in FIG. 23, the information exchange apparatus a processor 231, a network interface 232, a memory 233, and a communications bus 234. The communications bus 234 is configured to implement connection and communication between the processor 231, the network interface 232, and the memory 233, and the processor 231 performs a program stored in the memory 233 to implement the following method: receiving an instant messaging message that includes email description information and that is sent by an instant messaging server, where the email description information is received by the instant messaging server and is sent by an message conversion platform, and is sent to the apparatus by using an email address sent by the message conversion platform; the email description information and the email address are received by the message conversion platform and are sent by an email server, and are email description information and an email address of a current email of the email server; a sender instant messaging account or a receiver instant messaging account is logged in to the apparatus, the sender instant messaging account is an instant messaging account bound to a sender email address included in the email address, and the receiver instant messaging account is an instant messaging account bound to a receiver email address included in the email address; and displaying the instant messaging message.

Optionally, the instant messaging message may carry identification information of a target email address, and the target email address is an email address bound to an instant messaging account logged in to the apparatus.

The program executed by the processor 231 may further include extracting the identification information from the instant messaging message, and sending, to a light app server, an email viewing request carrying the identification information and the target email address, so that the light app server obtains the current email from the email server by using the identification information and the target email address, and performs web page format conversion on the current email, to obtain a web page converted from the current email; and receiving the web page that is converted from the current email and that is returned by the light app server in response to the email viewing request.

It should be noted that the information exchange apparatus in this embodiment may be installed on any instant messaging client described in the embodiments shown in FIG. 1 to FIG. 12, and the implementations of the instant messaging clients described in the embodiments shown in FIG. 1 to FIG. 12 may all be implemented by the information exchange apparatus in this embodiment.

In this embodiment, exchange efficiency of email information can be improved.

Figure 24:
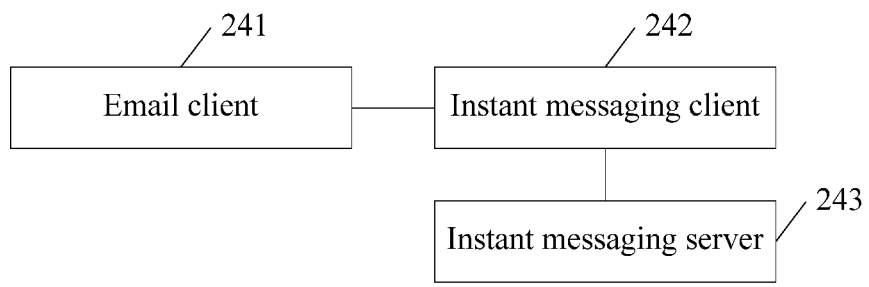
FIG. 24 is a schematic structural diagram of an information exchange system according to an embodiment of the present disclosure.

Referring to FIG. 24, FIG. 24 is a schematic structural diagram of an information exchange system according to an embodiment of the present disclosure. As shown in FIG. 24, the information exchange system includes an email client 241, an instant messaging client 242, and an instant messaging server 243.

The email client 241 is configured to obtain a receiver email address and email description information of a current email, determine whether an instant messaging account bound to the receiver email address satisfies a pre-stored session initiation condition, and if yes, send the receiver email address and the email description information to the instant messaging client 242 in to which a sender instant messaging account is logged, where the sender instant messaging account is an instant messaging account bound to the sender email address.

The instant messaging client 242 is configured to send a session creation request to the instant messaging server 243, where the session creation request is used to request for creating a session including the sender instant messaging account and a receiver instant messaging account, and the receiver instant messaging account is the instant messaging account bound to the receiver email address.

The instant messaging server 243 is configured to create the session in response to the session creation request.

The instant messaging client 242 is further configured to send, in the session, an instant messaging message including the email description information.

It should be noted that the email client, the instant messaging client, and the instant messaging server in this embodiment may further respectively implement any implementation of the email client, the instant messaging client, and the instant messaging server that are described in the embodiments shown in FIG. 1 to FIG. 12.

In this embodiment, exchange efficiency of email information can be improved.

Figure 25:
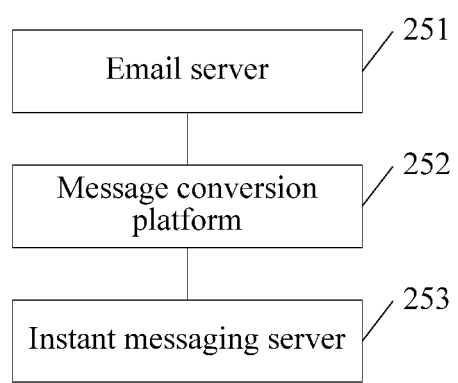
FIG. 25 is a schematic structural diagram of another information exchange system according to an embodiment of the present disclosure.

Referring to FIG. 25, FIG. 25 is a schematic structural diagram of another information exchange system according to an embodiment of the present disclosure. As shown in FIG. 25, the information exchange system includes a message conversion platform 252, an email server 251, and an instant messaging server 253.

The message conversion platform 252 is configured to receive an email message sent by the email server 251, where the email message carries an email address and email description information of a current email, and the email address includes a sender email address and a receiver email address of the current email.

The message conversion platform 252 is further configured to determine whether the current email satisfies a pre-stored session creation condition, and if yes, send the email address and an instant messaging message including the email description information to the instant messaging server.

The instant messaging server 253 is configured to send the instant messaging message to a sender instant messaging account and a receiver instant messaging account by using the email address, where the sender instant messaging account is an instant messaging account bound to the sender email address, and the receiver instant messaging account is an instant messaging account bound to the receiver email address.

It should be noted that the message conversion platform, the email server, and the instant messaging server in this embodiment may further respectively implement any implementation of the message conversion platform, the email server, and the instant messaging server that are described in the embodiments shown in FIG. 1 to FIG. 12.

In this embodiment, exchange efficiency of email information can be improved.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may include a magnetic disc, an optical disc, a read-only memory (ROM), a random access memory (RAM), or the like.

What are disclosed above are merely examples of the embodiments of the present disclosure, and certainly are not intended to limit the protection scope of the present disclosure. Therefore, equivalent variations made in accordance with the claims of the present disclosure shall fall within the scope of the present disclosure.

What is claimed is:

1. An information exchange method, comprising:
    obtaining, by an email client, a receiver email address and email description information of a current email;
    determining, by the email client, whether an instant messaging account bound to the receiver email address satisfies a pre-stored session initiation condition; and
    sending, by the email client, the receiver email address and the email description information to an instant messaging client of a sender of the current email when the instant messaging account bound to the receiver email address satisfies the session initiation condition, wherein the instant messaging client of the sender is logged with a sender instant messaging account such that the instant messaging client requests an instant messaging server to create a session comprising the sender instant messaging account and a receiver instant messaging account, and the instant messaging client sends, in the session, an instant messaging message comprising the email description information to the receiver instant messaging account, wherein the sender instant messaging account is bound to a sender email address, and wherein the receiver instant messaging account is bound to the receiver email address.

2. The method of claim 1, further comprising querying, by the email client, an online status of the instant messaging account bound to the receiver email address, and wherein the email client determining whether an instant messaging account bound to the receiver email address satisfies a pre-stored session initiation condition comprises determining, by the email client, whether the online status satisfies the pre-stored session initiation condition.

3. The method of claim 1, wherein the receiver email address comprises at least one email address, wherein at least one of the email address comprised in the receiver email address is bound to an instant messaging account, and wherein the session initiation condition comprises at least one of:
    an online instant messaging account existing in the instant messaging account bound to the email address comprised in the receiver email address;
    a quantity of online instant messaging accounts in the instant messaging account bound to the email address comprised in the receiver email address exceeding a preset quantity threshold;
    a proportion of online instant messaging accounts in the instant messaging account bound to the email address comprised in the receiver email address exceeding a preset proportion threshold;
    an instant messaging account currently logged in to a mobile terminal existing in the instant messaging account bound to the email address comprised in the receiver email address; or
    a quantity of instant messaging accounts currently logged in to a mobile terminal device in the instant messaging account bound to the email address comprised in the receiver email address exceeding a preset quantity threshold.

4. The method of claim 1, further comprising:
    receiving, by the email client, instant messaging information from the instant messaging client, wherein the instant messaging information is comprised in the instant messaging message transmitted in the session;
    generating, by the email client, an email comprising the instant messaging information; and
    sending, by the email client, the email comprising the instant messaging information to an email server.

5. The method of claim 1, wherein the email description information comprises at least one an email title, an email abstract, an email logo, or an email attachment.

6. An information exchange method, comprising:
    receiving an email message from an email server, wherein the email message carries an email address and email description information of a current email, and wherein the email address comprises a sender email address and a receiver email address of the current email;
    determining whether the current email satisfies a pre-stored session creation condition; and
    sending the email address and an instant messaging message comprising the email description information to an instant messaging server when the current email satisfies the session creation condition such that the instant messaging server sends the instant messaging message to a sender instant messaging account and a receiver instant messaging account using the email address, wherein the sender instant messaging account is bound to the sender email address, and wherein the receiver instant messaging account is bound to the receiver email address.

7. The method of claim 6, wherein sending the email address and the instant messaging message comprising the email description information to the instant messaging server comprises:
    sending a session creation request carrying the email address to the instant messaging server, wherein the session creation request requests the instant messaging server to create a session comprising the sender instant messaging account and the receiver instant messaging account; and
    sending the instant messaging message comprising the email description information to the instant messaging server, wherein the instant messaging message enables the instant messaging server to send the instant messaging message in the session.

8. The method of claim 6, wherein the receiver email address comprises at least one email address, wherein at least one of the email address comprised in the receiver email address is bound to an instant messaging account, and wherein the session creation condition comprises at least one of:
an instant messaging account currently logged in to a mobile terminal existing in the instant messaging account bound to the email address comprised in the receiver email address;
a quantity of instant messaging accounts currently logged in to a mobile terminal device in the instant messaging account bound to the email address comprised in the receiver email address exceeding a preset quantity threshold;
a particular instant messaging account existing in the instant messaging account bound to the email address comprised in the receiver email address, wherein the particular instant messaging account is an instant messaging account having a particular relationship with the sender instant messaging account;
a quantity of particular instant messaging accounts in the instant messaging account bound to the email address comprised in the receiver email address exceeding a preset quantity threshold, wherein the particular instant messaging account is an instant messaging account having a particular relationship with the sender instant messaging account;
a quantity of times for which the current email is processed exceeding a preset quantity-of-times threshold, wherein the quantity of times for which the current email is processed comprises one of a quantity of times for which the current email is forwarded, or a quantity of times for which the current email is replied, or a quantity of times for which the current email is forwarded and a quantity of times for which the current email is replied;
an online instant messaging account existing in the instant messaging account bound to the email address comprised in the receiver email address;
a quantity of online instant messaging accounts in the instant messaging account bound to the email address comprised in the receiver email address exceeding a preset quantity threshold; or
a proportion of online instant messaging accounts in the instant messaging account bound to the email address comprised in the receiver email address exceeding a preset proportion threshold.

9. The method of claim 6, further comprising:
sending a query request carrying the receiver email address to the email server, wherein the query request requests the email server to query identification information of the receiver email address, and wherein the email server stores the identification information of the receiver email address; and
receiving the identification information that is of the receiver email address and that is returned by the email server in response to the query request, wherein the instant messaging message carries the identification information of the receiver email address such that an instant messaging client in to which the receiver instant messaging account is logged extracts the identification information of the receiver email address from the instant messaging message, the instant messaging client sends, to a light application server, an email viewing request carrying the identification information of the receiver email address and the receiver email address, and the instant messaging client receives a web page that is converted from the current email and that is returned by the light application server in response to the email viewing request, wherein the web page is obtained by the light application server by performing web page format conversion on the current email obtained from the email server, and wherein the light application server obtains the current email from the email server using the identification information of the receiver email address and the receiver email address.

10. The method of claim 6, wherein the email description information comprises at least one of an email title, an email abstract, an email logo, or an email attachment.

11. An information exchange apparatus, comprising:
a communication bus;
a network interface coupled to the communication bus;
a memory coupled to the communication bus;
a processor coupled to the communication bus, wherein the communication bus implements connection and communication between the processor, the network interface, and the memory, and the processor executes program stored in the memory to implement a method comprising:
obtaining a receiver email address and email description information of a current email;
determining whether an instant messaging account bound to the receiver email address satisfies a pre-stored session initiation condition; and
sending the receiver email address and the email description information to an instant messaging client in to which a sender instant messaging account is logged when the instant messaging account bound to the receiver email address satisfies the session initiation condition such that the instant messaging client requests an instant messaging server to create a session comprising the sender instant messaging account and a receiver instant messaging account, and the instant messaging client sends, in the session, an instant messaging message comprising the email description information, wherein the sender instant messaging account is an instant messaging account bound to a sender email address, and wherein the receiver instant messaging account is the instant messaging account bound to the receiver email address.

12. The apparatus of claim 11, wherein the method further comprises querying an online status of the instant messaging account bound to the receiver email address, and wherein the processor determines whether the instant messaging account bound to the receiver email address satisfies the pre-stored session initiation condition by determining whether the online status satisfies the pre-stored session initiation condition.

13. The apparatus of claim 11, wherein the receiver email address comprises at least one email address, wherein at least one of the email address comprised in the receiver email address is bound to an instant messaging account, and wherein the session initiation condition comprises at least one of:
an online instant messaging account existing in the instant messaging account bound to the email address comprised in the receiver email address;

a quantity of online instant messaging accounts in the instant messaging account bound to the email address comprised in the receiver email address exceeding a preset quantity threshold;

a proportion of online instant messaging accounts in the instant messaging account bound to the email address comprised in the receiver email address exceeding a preset proportion threshold;

an instant messaging account currently logged in to a mobile terminal existing in the instant messaging account bound to the email address comprised in the receiver email address; or a quantity of instant messaging accounts currently logged in to a mobile terminal device in the instant messaging account bound to the email address comprised in the receiver email address exceeding a preset quantity threshold.

14. The apparatus of claim 11, wherein the method further comprises:

receiving instant messaging information from the instant messaging client, wherein the instant messaging information is comprised in the instant messaging message transmitted in the session;

generating an email comprising the instant messaging information; and sending the email comprising the instant messaging information to an email server.

15. The apparatus of claim 11, wherein the email description information comprises an email title.

16. The apparatus of claim 11, wherein the email description information comprises an email abstract.

17. The apparatus of claim 11, wherein the email description information comprises an email logo.

18. The apparatus of claim 11, wherein the email description information comprises an email attachment.

* * * * *

UNITED STATES PATENT AND TRADEMARK OFFICE
CERTIFICATE OF CORRECTION

PATENT NO. : 10,834,031 B2  
APPLICATION NO. : 16/047794  
DATED : November 10, 2020  
INVENTOR(S) : Shen Page 1 of 1

It is certified that error appears in the above-identified patent and that said Letters Patent is hereby corrected as shown below:

In the Claims

Claim 11, Column 40, Line 25: "and the processor" should read "and wherein the processor"

Signed and Sealed this  
Twenty-second Day of December, 2020

Andrei Iancu  
*Director of the United States Patent and Trademark Office*